United States Patent
Itoh

(10) Patent No.: US 7,486,634 B2
(45) Date of Patent: Feb. 3, 2009

(54) ADAPTIVE MODULATION BASED ON SIGNAL QUALITY

(75) Inventor: Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 741 days.

(21) Appl. No.: 10/415,220

(22) PCT Filed: Aug. 28, 2002

(86) PCT No.: PCT/JP02/08647

§ 371 (c)(1),
(2), (4) Date: Nov. 6, 2003

(87) PCT Pub. No.: WO03/021903

PCT Pub. Date: Mar. 13, 2003

(65) Prior Publication Data

US 2005/0226182 A1    Oct. 13, 2005

(30) Foreign Application Priority Data

Aug. 28, 2001 (JP) .............................. 2001-258697

(51) Int. Cl.
*H04L 1/00* (2006.01)
(52) U.S. Cl. ................. 370/318; 370/252; 370/230; 370/231; 370/233; 455/522; 455/69; 455/67.11
(58) Field of Classification Search ................ 370/352, 370/320, 338, 394, 252, 318, 230.1, 231–235, 370/333; 455/522, 69, 67.11
See application file for complete search history.

(56) References Cited

U.S. PATENT DOCUMENTS

| 6,697,987 | B2* | 2/2004 | Lee et al. ..................... 714/751 |
| 6,987,754 | B2* | 1/2006 | Shahar et al. ................ 370/349 |
| 2002/0018446 | A1* | 2/2002 | Huh et al. .................... 370/245 |
| 2002/0110088 | A1 | 8/2002 | Lundby et al. |
| 2002/0167907 | A1* | 11/2002 | Sarkar et al. ................ 370/252 |
| 2003/0128674 | A1* | 7/2003 | Kong et al. .................. 370/320 |
| 2005/0096080 | A1* | 5/2005 | Choi et al. .................... 455/522 |

(Continued)

FOREIGN PATENT DOCUMENTS

| EP | 0 682 419 | 11/1995 |
| JP | EP0682419 A2 * | 11/1995 |

(Continued)

OTHER PUBLICATIONS

Naijoh et al.,M. *Type-II Hybrid ARQ Scheme using Punctured Convolutional Code with Adaptive Modulation Systems*, CS 96-24~31, May 21, 1996, vol. 96, No. 49, pp. 19-24.

(Continued)

*Primary Examiner*—Vincent P Harper
*Assistant Examiner*—Dung Lam
(74) *Attorney, Agent, or Firm*—Frommer Lawrence & Haug LLP; William S. Frommer; Thomas F. Presson

(57) ABSTRACT

An apparatus and a method for improving the transmission efficiency when a retransmission of a communication is attained based on a Hybrid-ARQ (Automatic repeat ReQuest) system. A mode determining unit of a base station executes calculations to obtain a received signal quality difference between a received signal quality at the current stage and that of a past stage at a terminal, and supplies the received signal quality difference to a control unit. The control unit controls a power setting unit based on the received signal quality difference to control a transmission power of a signal transmitted from an adaptive coding and modulation unit. The present invention can be applied to a base station of a portable telephone communication network.

8 Claims, 16 Drawing Sheets

FOREIGN PATENT DOCUMENTS

| | | |
|---|---|---|
| JP | 8-251141 | 9/1996 |
| JP | 11-331296 | 11/1999 |
| JP | 2001-522553 | 11/2001 |
| JP | 2002-524918 | 8/2002 |
| WO | WO 95 10142 | 4/1995 |
| WO | WO 98/49797 | 11/1998 |
| WO | WO 00/13364 | 3/2000 |
| WO | WO 01 08322 | 2/2001 |

OTHER PUBLICATIONS

Ghosh A et al: "Performance of coded higher order modulation and hybrid ARQ for next generation cellular CDMA systems" Vehicular Technology Conference, 2000. IEEE VTS Fall VTS 2000. 52$^{nd}$ Sep. 24-28, 2000, Piscataway, NJ, USA,IEEE, vol. 2, Sep. 24, 2000, pp. 500-505, XP010525438 ISBN: 0-7803-6507-0.

* cited by examiner

FIG.3

| MODE | CODING RATE | MODULATION SYSTEM |
|---|---|---|
| 0 | R=1/2 | QPSK |
| 1 | R=1/2 | 16-QAM |
| 2 | R=3/4 | 16-QAM |

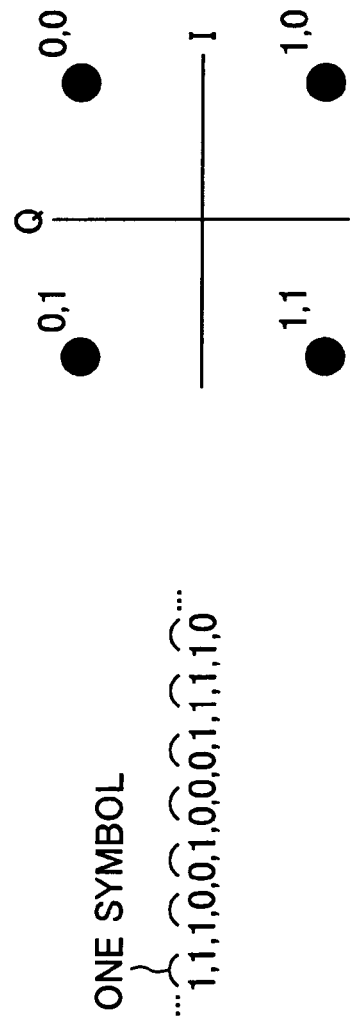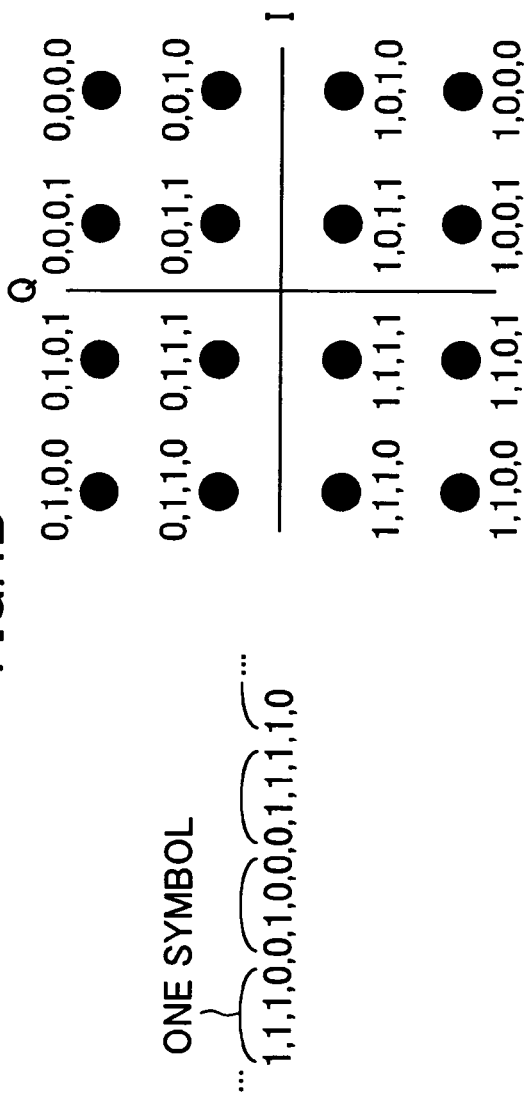

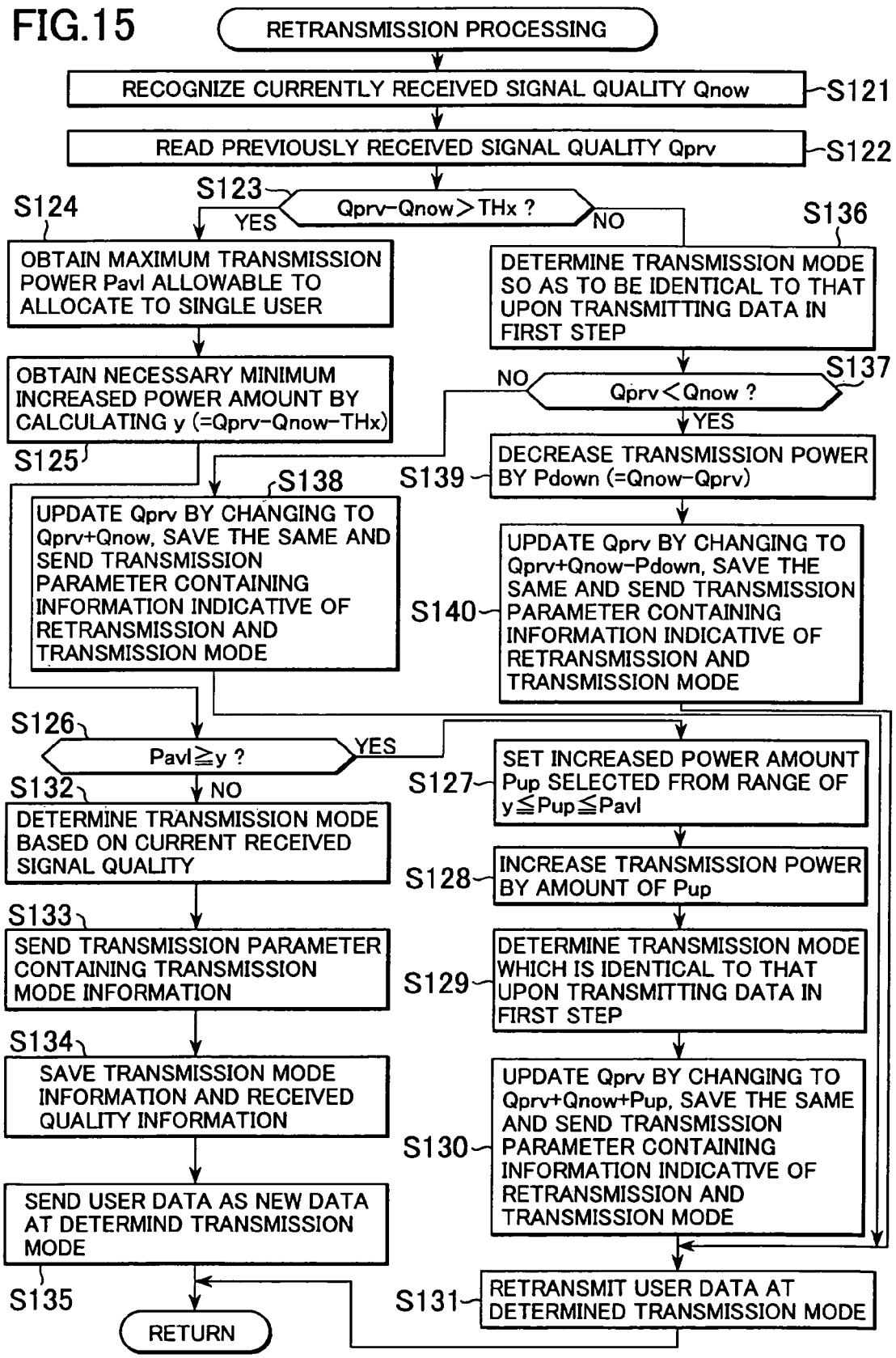

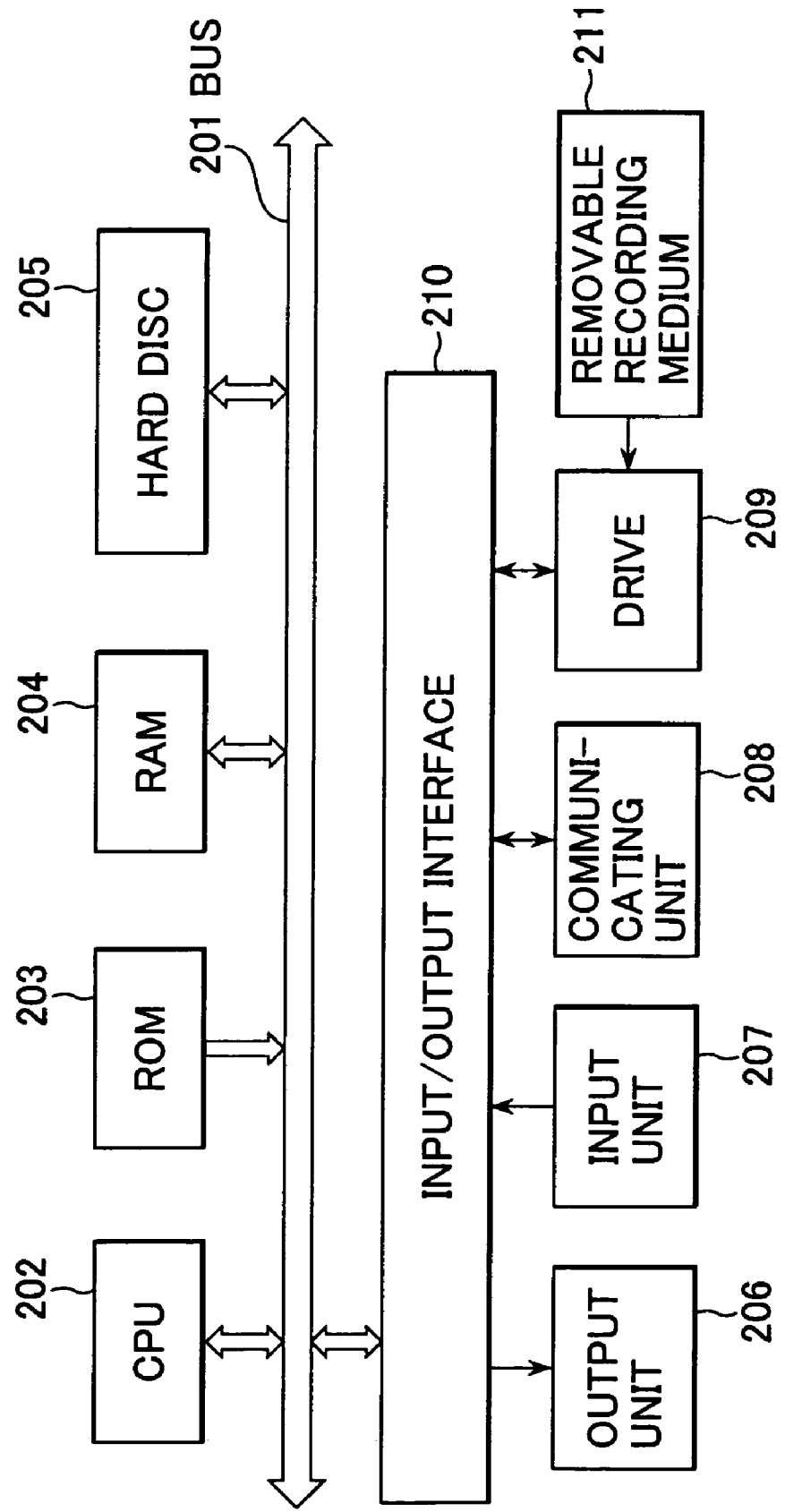

ADAPTIVE MODULATION BASED ON SIGNAL QUALITY

TECHNICAL FIELD

The present invention relates to a transmission apparatus and a method for controlling signal transmission. In more particularly, the present invention relates to a transmission apparatus and a method for controlling signal transmission for use in a communication system for portable telephones or the like, wherein transmission power, modulation systems, coding systems and packet synthesizing method are properly selected in accordance with the received information which are useful for adaptive modulation and coding transmission upon signal retransmission, and accordingly, a packet transmission can be achieved in more effective manner. In other words, the present invention relates to a transmission apparatus and a method for controlling signal transmission, and in more particularly, the present invention relates to a transmission apparatus and a method for controlling signal transmission that are able to effectively transmit data from a base station to a terminal such as a portable telephone or the like.

BACKGROUND ART

An adaptive modulation and coding rate communication system has been proposed to present a high rate communication while sacrificing noise resistant characteristic to a user who holds a propagation path of a high quality, and to present a low rate communication while keeping the noise resistant characteristic to a user who only has a propagation path of a low quality, by changing the coding rate of an error correction code and the degree of multilevel modulation in accordance with the quality of the propagation path. Further, as a retransmission system, a Hybrid ARQ (Automatic repeat ReQuest) system has been proposed in which data retransmission control (ARQ) and error correction code are combined.

In this case, detail descriptions about the Hybrid ARQ can be found in D. Chase "Code Combining—a Maximum-Likelihood Decoding Approach for Combining an Arbitrary Number of Noisy Packets", IEEE Trans. Commu., vol. 33, No. 5, pp. 385-393, May, 1985, and also, can be found in Miki, Arataet. al, "Characteristic of HybridARQ in a situation of W-CDMA downlink high speed packet transmission" of a technical study report of the Society of Electronics, Information and Communication Engineers at Vol. 100 No. 343 2000-10.

The communication system employing the adaptive modulation and coding rate (hereinafter selectively referred to as adaptive coding and modulation system) has been recently introduced into a radio communication system. Further, it is expected that the same communication system will be introduced, in addition, into a communication situation using a W-CDMA (Wideband-Code Division Multiple Access).

In the situation using the adaptive coding and modulation system, the following fundamental procedures are carried out so as to attain the adaptive coding and modulation on the communication between a base station and a terminal.

1. The terminal determines a received quality of a signal which is transmitted from the base station.

2. The terminal notifies the result of the determination back to the base station.

3. The base station determines a modulation system and a coding rate which provide an optimum performance based on a received signal quality message transmitted from the terminal, and then the base station transmits transmission parameters indicative of the determined modulation system and the coding rate.

4. The base station transmits user data based on the transmission parameters.

5. The terminal receives the transmission parameters and carries out a data receiving processing based on the received transmission parameters.

6. If the terminal determines that the data transmitted from the base station is one concerning a retransmission data, then the terminal carries out error correction processing after synthesizing the received data containing error in the past with the transmitted data concerning the retransmission data.

7. If the terminal detects any error in the received data after carrying out the error correction, the terminal transmits a retransmission request, while if the terminal can accurately receive the data, the terminal transmits a new data transmission request to the base station.

8. The above steps 1 to 7 are periodically repeated.

FIG. 1 illustrates a manner of the above mentioned processing sequence. As shown in FIG. 1, illustrated are relations among a downlink control channel for notifying the terminal of the transmission parameter from the base station, a downlink data channel for transmitting the user data from the base station to the terminal, and an uplink control channel for transmitting a transmission parameter request from the terminal. An example shown in this figure is the one in which the above mentioned steps 1 to 7 are repeated at a predetermined frame period.

That is, as shown in FIG. 1, the terminal determines the received signal quality at the terminal at the current timing point, and then the terminal transmits a received signal quality message indicative of the received signal quality to the base station through the uplink control channel.

The base station responds to the received signal quality message transmitted from the terminal and determines a combination of a modulation system and a coding rate which makes it possible to lower the received data error rate at the terminal below a predetermined value. Then, the base station transmits the information indicative of the selected modulation system and the coding rate as a transmission parameter to the terminal through the downlink control channel. Furthermore, the base station transmits the user data to the terminal through the downlink data channel in accordance with the modulation system and the coding rate which correspond to the transmission parameter transmitted to the terminal.

Then the terminal receives the transmission parameter transmitted from the base station in the previous stage, and the terminal recognizes the modulation system and the coding rate for the user data transmitted from the base station, in accordance with it. Thereafter, the terminal further receives the user data transmitted from the base station and carries out the demodulation based on the demodulation system which corresponds to the modulation system designated by the transmission parameter. Also, the terminal carries out the decoding based on the decoding system which corresponds to the coding rate designated by the transmission parameter. The terminal carries out error detection of the user data which is obtained by the demodulation and the decoding, and, if no error is detected, then the terminal transmits a request message for new user data and a received signal quality message to the base station through the uplink control channel, for example. Meanwhile, the request message for the new user data contains a message indicating that the user data received in the previous stage is able to be normally received.

On the other hand, if any error is detected in the user data obtained by carrying out the demodulation and the decoding, then the terminal transmits a retransmission request message requesting that the base station should retransmit the same user data through the uplink control channel to the base station. When the base station receives the retransmission request message, then the base station retransmits the user data again to the terminal.

The terminal receives the user data which is retransmitted from the base station, and synthesizes the user data with the error detected user data which is received in the previous stage, and the terminal carries out the error correction processing on the synthesized user data. Thus, the terminal carries out the error detection on the user data after carrying out the error correction processing, and if the terminal detects any error in the user data, then the terminal transmits a retransmission request message again to the base station. In this way, the similar processing is repeated. On the other hand, if the terminal detects no error in the user data after carrying out the error correction processing, as described above, the terminal transmits a request message for new user data and the received signal quality message to the base station through the uplink control channel, for example.

FIG. 1 contains terms of downlink data channel, downlink control channel, and uplink control channel, and the words "downlink" and "uplink" mean a channel of a signal transmitted from the base station to the terminal and a channel of a signal transmitted from the terminal to the base station, respectively. That is, the word "downlink" is utilized for a name of a channel through which the signal is transmitted from the base station to the terminal and the word "uplink" is utilized for a name of a channel through which a signal is transmitted from the terminal to the base station.

The transmission parameter means various parameters which will be necessary when data is transmitted from the base station to the terminal. Therefore, the information designated by the transmission parameter is not limited to the coding rate, the modulation system at the base station.

FIG. 2 is a diagram showing an example of an arrangement of a conventional base station which realizes a communication system employing an adaptive modulation and coding rate (adaptive coding and modulation system).

The base station is arranged to include a transmission/reception compatible unit 1, an inverse spreading unit 2, a power control bit extracting unit 3, a retransmission request message extracting unit 4, a received signal quality message extracting unit 5, a mode determining unit 6, a control unit 7, a control data generating unit 8, a coding and modulation unit 9, a power adjusting unit 10, a spreading unit 11, a retransmission data buffer 12, an adaptive coding and modulation unit 13, and an antenna 14.

The base station demodulates a transmission signal from the terminal operated by a user at the transmission/reception compatible unit 1 and the inverse spreading unit 2.

That is, for example, a transmission signal carried out a spectrum spreading is transmitted to the base station from a terminal capable of doing radio communication composed of a portable telephone, PDA (Personal Digital Assistant) or the like. The transmitted signal is received by the antenna 14 and supplied to the transmission/reception compatible unit 1. The transmission/reception compatible unit 1 is supplied with the signal from the antenna 14 and subjects the signal to a necessary processing and then supplies the resultant signal to the inverse spreading unit 2. The inverse spreading unit 2 carries out an inverse spectrum spreading on the signal supplied from the transmission/reception compatible unit 1 and supplies the resultant signal to the power control bit extracting unit 3.

The power control bit extracting unit 3 extracts a power control bit from the signal supplied from the inverse spreading unit 2. That is, the transmitted signal transmitted from the terminal to the base station contains the power control bit as a one-bit flag indicating a request of increase or decrease of power transmitted through the downlink control channel as described with reference to FIG. 1. The power control bit extracting unit 3 extracts such a power control bit from the signal supplied from the inverse spreading unit 2 and transfers the power control bit to the power adjusting unit 10.

The power control bit extracting unit 3 extracts the power control bit from the signal supplied from the inverse spreading unit 2 and supplies the signal to the retransmission request message extracting unit 4. The retransmission request message extracting unit 4 extracts a retransmission request message from the signal supplied from the power control bit extracting unit 3.

That is, the transmitted signal transmitted from the terminal to the base station contains the retransmission request message indicating whether a retransmission of the user data is requested or not, as described with reference to FIG. 1. The retransmission request message extracting unit 4 extracts the retransmission request message from the signal supplied from the power control bit extracting unit 3 and transmits the retransmission request message to the control unit 7.

The retransmission request message extracting unit 4 extracts the retransmission request message from the signal supplied from the power control bit extracting unit 3 and also transmits the signal to the received signal quality message extracting unit 5. The received signal quality message extracting unit 5 extracts the received signal quality message from the signal supplied from the retransmission request message extracting unit 4.

That is, the transmitted signal transmitted from the terminal to the base station contains the received signal quality message indicating the received signal quality at the terminal, as described with reference to FIG. 1. The received signal quality message extracting unit 5 extracts the received signal quality message from the signal supplied from the retransmission request message extracting unit 4 and transmits the received signal quality message to the mode determining unit 6.

In this case, the signal exchanged between the terminal and the base station is composed of frames each having a predetermined time span. Further, each frame is composed of a plural number, e.g., N, of slots of which time span unit is 0.6667 msec (millisecond), for example. The above described power control bit is arranged so that the power control bit is transmitted from the terminal to the base station at each slot. Therefore, the power control bit extracting unit 3 extracts the power control bit at every slot. Further, when the terminal transmits the signal, the retransmission request message and the received signal quality message are disposed at every frame. Therefore, the retransmission request message extracting unit 4 and the received signal quality message extracting unit 5 carry out respective extracting operations at every frame to extract the retransmission request message and the received signal quality message.

The mode determining unit 6 determines an optimum modulation system and coding rate in accordance with the received signal quality message and the state of the resources owned by the base station, and assigns code resources and power resources to the user (terminal).

Accordingly, now a term of transmission mode is taken as a combination of the modulation system and the coding rate, then the mode determining unit 6 determines the transmission mode in accordance with the received signal quality message supplied from the received signal quality message extracting unit 5 and the resources of the base station. Then, the mode determining unit 6 supplies the information of the transmission mode to the control unit 7.

In this case, there are various kinds of possible combinations of the coding rates and the modulation systems and hence the transmission mode can take various types of modes, but in here, in order to simplify the description thereof, description will be made on three kinds of transmission modes, i.e., modes of #0 to #2 as shown in FIG. 3.

As shown in FIG. 3, R=½ and R=¾ are prepared for examples of the coding rates (coding systems). The coding rate of R=½ means that a redundant bit of one bit is added to every one bit of input data. The coding rate of R=¾ means that a redundant bit of one bit is added to every three bits of input data. If the data is coded at the coding rate of R=½, as compared with a case in which the data is coded at the coding rate of R=¾, the whole data contains a larger number of redundant bits relative to the input data. Therefore, the error correction capability is strengthen but only small amount of data can be transmitted. Conversely, if the data is coded at the coding rate of R=¾, as compared with a case in which the data is coded at the coding rate of R=½, the whole data contains a smaller number of redundant bits relative to the input data. Therefore, the error correction capability is inferior to the case in which the data is coded at the coding rate of R=½ but a large amount of data can be transmitted.

As shown in FIG. 3, an QPSK (Quadrature Phase Shift Keying) and a 16QAM (Quadrature Amplitude Modulation) are prepared for examples of modulation systems. As shown in FIG. 4, if the QPSK modulation system is selected, the coded data are converted into symbols composed of two bits, and these symbols are mapped on any of four-symbol group (see FIG. 4A). Conversely, if the 16QAM modulation system is selected, the coded data are converted into symbols composed of four bits, and these symbols are mapped on any of 16-symbol group (see FIG. 4B). If it is assumed that a symbol rate capable of being transmitted is constant, the modulation system of the 16QAM has a larger amount of data actually being transmitted than the modulation system of the QPSK. However, since the modulation system of the 16QAM has a smaller intersymbol distance than the modulation system of the QPSK, the noise characteristic is to be deteriorated.

As shown in FIG. 3, a combination of the coding rate of R=½ and the modulation system of the QPSK, a combination of the coding rate of R=½ and the modulation system of the 16QAM, and a combination of the coding rate of R=¾ and the modulation system of the 16QAM are defined as transmission modes of #0, #1, and #2, respectively. Therefore, the relation of the data transfer rate among these transmission modes is to be given as follows. That is, the transmission mode of #0 (R=½, QPSK)<the transmission mode of #1 (R=½, 16QAM) <the transmission mode of #2 (R=¾, 16QAM). On the other hand, the relation of the noise withstand characteristic among these transmission modes can be given as follows. That is, the transmission mode of #0 (R=½, QPSK)>the transmission mode of #1 (R=½, 16QAM)>the transmission mode of #2 (R=¾, 16QAM).

According to the adaptive coding and modulation system, the coding rate and the modulation system can be selectively determined depending on the nature of the signal transmission path. That is, if the noise level is low and the transmission path is good (i.e., the received signal quality at the terminal is good), a combination of the coding rate and the modulation system providing a large amount of data transfer rate (transmission mode) is selected to carry out effective data transmission. Conversely, if the noise level is high and the transmission path is bad (i.e., the received signal quality at the terminal is bad), a combination of the coding rate and the modulation system providing a high noise withstand characteristic (transmission mode) is selected to carry out data transmission in which the data transfer rate is suppressed and error correction characteristic is strengthened.

Now description is again made on a matter concerning FIG. 2. Initially, the control unit 7 confirms the retransmission request message transmitted from the retransmission request message extracting unit 4. If it is confirmed that there is a retransmission request message, the control unit 7 transmits information indicative of a transmission mode identical to that upon initially transmitting the user data (i.e., the transmission mode upon transmitting the first user data) and a retransmission flag indicating that this transmission is a retransmission, to the control data generating unit 8 and the adaptive coding and modulation unit 13. Further, if there is no retransmission request, the control unit 7 transfers a transmission mode determined by the mode determining unit 6 to the control data generating unit 8 and the adaptive coding and modulation unit 13.

The control data generating unit 8 makes the information indicative of the transmission mode supplied from the control unit 7 be involved in the transmission parameter to be transmitted through the downlink control channel which is described with reference to FIG. 1. Further, the control data generating unit 8 generates control data having the transmission parameter involved therein and supplies the control data to the coding and modulation unit 9. If the control data generating unit 8 is supplied with a retransmission request flag in addition to the information indicative of the transmission mode from the control unit 7, the control data generating unit 8 makes the retransmission request flag be involved in the transmission parameter. The coding and modulation unit 9 subjects the control data supplied from the control data generating unit 8 to a coding and modulation processing which is effected in a previously determined system. Then, the coding and modulation unit 9 supplies the resultant modulated signal to the power adjusting unit 10.

The power adjusting unit 10 determines a level of transmission power for transmitting data through the downlink control channel described with reference to FIG. 1, in accordance with the power control bit supplied from the power control bit extracting unit 3. That is, as described above, the power control bit is a one-bit flag, for example, and when the power control bit is 1, then the power adjusting unit 10 increases the transmission power for the downlink control channel by 1 dB, and when the power control bit is 0, then the power adjusting unit 10 decreases the transmission power for the downlink control channel by 1 dB. Thus, the modulated signal supplied from the coding and modulation unit 9 is processed. In this way, it becomes possible to provide an arrangement for transmitting data through the downlink control channel to the terminal at an optimum power. In a communication using the CDMA, this manner of controlling the transmission power in the downlink control channel has been generally employed.

The modulated signal carried out the transmission power adjustment in the power adjusting unit 10 is supplied to the spreading unit 11.

Meanwhile, the adaptive coding and modulation unit 13 is supplied with the packet data having the user data disposed therein, and to be transmitted through the downlink data channel that is described with reference to FIG. 1. The adaptive coding and modulation unit 13 subjects the packet data to a coding processing by using the coding rate which is indicated in the transmission mode information supplied from the control unit 7. Further, the adaptive coding and modulation unit 13 effects the modulation processing on the coded packed data by using the modulation system which is indicated in the transmission mode information. Thus, the modulated signal obtained by the coding and modulating the packet data is supplied to the spreading unit 11.

The packet data supplied to the adaptive coding and modulation unit 13 is also supplied to the retransmission data buffer 12. The retransmission data buffer 12 temporarily stores therein the packet data. When the retransmission request message supplied from the retransmission request message extracting unit 4 indicates a request of retransmission, the control unit 7 controls the retransmission data buffer 12 so that the packet data to be subjected to the retransmission is supplied to the adaptive coding and modulation unit 13. In this case, the adaptive coding and modulation unit 13 effects the coding processing and modulation processing as described above on the packet data supplied from the retransmission data buffer 12, i.e., the packet data identical to that transmitted in the previous step. Then, the resultant modulated signal is supplied to the spreading unit 11. In this way, the packet data is again transmitted.

FIG. 5 is a diagram showing an arrangement of the adaptive coding and modulation unit 13 in which three transmission modes, i.e., modes of #0 to #2 shown in FIG. 3 are prepared.

The packet data inputted into the adaptive coding and modulation unit 13 is supplied to a switch 21.

If the transmission mode information supplied from the control unit 7 indicates the transmission mode #0, the switch 21 selects a terminal 21a and a switch 24 selects a terminal 24a.

The terminal 21a is connected to a coding unit 22a. Therefore, if the transmission mode is #0, the packet data is supplied from the switch 21 to the coding unit 22a. The coding unit 22a encodes the packet data supplied thereto at the coding rate of R=½ so that an error correction code is added to the data. The resultant coded data is supplied to a QPSK modulating unit 23a. The QPSK modulating unit 23a effects a QPSK modulation on the coded data supplied from the coding unit 22a so that modulated symbols are mapped to form a constellation. The resultant modulated signal is supplied to the terminal 24a of the switch 24. When the transmission mode is #0, as described above, the switch 24 selects the terminal 24a. Therefore, the modulated signal outputted from the QPSK modulating unit 23a is supplied through the switch 24 to the spreading unit 11 (FIG. 2).

In this case, if the transmission mode information supplied from the control unit 7 indicates the transmission mode #1, the switch 21 selects a terminal 21b and the switch 24 selects a terminal 24b. The terminal 21b is connected to a coding unit 22b. Therefore, if the transmission mode is #1, the packet data is supplied from the switch 21 to the coding unit 22b. The coding unit 22b encodes the packet data supplied thereto at the coding rate of R=½ and the resultant coded data is supplied to a 16QAM modulating unit 23b. The 16QAM modulating unit 23b effects a 16QAM modulation on the coded data supplied from the coding unit 22b and the resultant modulated signal is supplied to the terminal 24b of the switch 24. When the transmission mode is #1, as described above, the switch 24 selects the terminal 24b. Therefore, the modulated signal outputted from the 16QAM modulating unit 23b is supplied through the switch 24 to the spreading unit 11 (FIG. 2).

Further, if the transmission mode information supplied from the control unit 7 indicates the transmission mode #2, the switch 21 selects a terminal 21c and the switch 24 selects a terminal 24c. The terminal 21c is connected to a coding unit 22c. Therefore, if the transmission mode is #2, the packet data is supplied from the switch 21 to the coding unit 22c. The coding unit 22c encodes the packet data supplied thereto at the coding rate of R=¾ and the resultant coded data is supplied to a 16QAM modulating unit 23c. The 16QAM modulating unit 23c effects a 16QAM modulation on the coded data supplied from the coding unit 22c and the resultant modulated signal is supplied to the terminal 24c of the switch 24. When the transmission mode is of #2, as described above, the switch 24 selects the terminal 24c. Therefore, the modulated signal outputted from the 16QAM modulating unit 23c is supplied through the switch 24 to the spreading unit 11 (FIG. 2).

Now description will be again provided with reference to FIG. 2. The spreading unit 11 effects the spectrum spreading on the modulated signal supplied from the power adjusting unit 10 and the modulated signal supplied from the adaptive coding and modulation unit 13 by using different spreading codes. A spread signal obtained by these operations is supplied to the transmission/reception compatible unit 1.

The transmission/reception compatible unit 1 effects a necessary processing on the spread signal supplied from the spreading unit 11 and transmits to the terminal as a radio wave from the antenna 14.

In this case, the modulated signal supplied from the power adjusting unit 10 is to be a signal transmitted through the downlink control channel shown in FIG. 1 and the modulated signal supplied from the adaptive coding and modulation unit 13 is to be a signal transmitted through the downlink data channel shown in FIG. 1.

FIG. 6 is a diagram showing an example of an arrangement of a conventional terminal which can realize a communication system employing an adaptive modulation and coding rate (adaptive coding and modulation system).

The terminal (user terminal) is arranged to include a transmission/reception compatible unit 31, an inverse spreading unit 32, a control channel received signal quality estimating unit 33, a power control bit generating unit 34, a data channel received signal quality estimating unit 35, a received signal quality message generating unit 36, a control data demodulating and decoding unit 37, a control unit 38, a user data demodulating and decoding unit 39, an error detecting unit 40, a retransmission request message generating unit 41, a retransmission request message inserting unit 42, a received signal quality message inserting unit 43, a power control bit inserting unit 44, a spreading unit 45, a received signal buffer 46, and an antenna 47.

The transmitted signal transmitted from the base station is received by the antenna 47. The received signal is subjected to the necessary processing in the transmission/reception compatible unit 31, and thereafter supplied to the inverse spreading unit 32. The inverse spreading unit 32 effects an inverse spectrum spreading on the signal supplied from the transmission/reception compatible unit 31 so that the signal is divided into a signal for the downlink data channel and a signal for the downlink control channel which are described with reference to FIG. 1. The inverse spreading unit 32 supplies the signal for the downlink control channel to the control channel received signal quality estimating unit 33 and the control data demodulating and decoding unit 37. Further, the inverse spreading unit 32 supplies the signal for the downlink data channel to the data channel received signal quality estimating unit 35 and the user data demodulating and decoding unit 39.

The control channel received signal quality estimating unit 33 estimates a signal to noise ratio (SNR (Signal to Noise Ratio)) based on a pilot signal which derives from time division multiplexing effected in the downlink control channel. That is, although description is not provided with reference to FIG. 2, in the base station, the spreading unit 11 carries out a time division multiplexing on a predetermined pilot signal with the demodulated signal supplied from the power adjusting unit 10. Thereafter, the spreading unit 11 carries out the spectrum spreading on the signal. Therefore, the signal transmitted through the downlink control channel contains the pilot signal in addition to the modulated signal supplied from the power adjusting unit 10. The control channel received signal quality estimating unit 33 estimates the SNR of the signal supplied from the inverse spreading unit 32 through the downlink control channel by using the pilot signal contained in the signal. Then, the control channel received signal quality estimating unit supplies the estimated SNR to the power control bit generating unit 34.

The power control bit generating unit 34 responds to the estimated SNR of the downlink control channel in such a manner that if the estimated SNR is better than a desired SNR then a power control bit of a value "0" is outputted to the power control bit inserting unit 44 while if the same is worse than the desired value then a power control bit of a value "11" is outputted to the power control bit inserting unit 44. In this case, the SNR estimation in the control channel received signal estimating unit 33 and the power control bit generation in the power control bit generating unit 34 are executed for every slot. Then, as described above, the base station described with reference to FIG. 2 controls the transmission power of the downlink control channel based on the power control bit so that the terminal can always receive the signal of the downlink control channel at a constant SNR.

The control data demodulating and decoding unit 37 demodulates and decodes the signal supplied from the inverse spreading unit 32 through the downlink control channel, separates the control data from the signal, and supplies the same to the control unit 38.

The control unit 38 detects the information concerning the coding rate and the modulation system to be applied to the downlink data channel, i.e., the transmission mode information, which is disposed in the control data supplied from the control data demodulating and decoding unit 37. Then, the control unit carries out mode setting (control) for the user data demodulating and decoding unit 39.

That is, as shown in a flowchart of FIG. 7, initially at step S1, the control unit 38 detects the transmission mode from the control data supplied from the control data demodulating and decoding unit 37 and the processing proceeds to step S2. At step S2, the control unit 38 examines whether the modulation system indicated by the transmission mode is the QPSK modulation or not. At step S2, if it is determined that the modulation system indicated by the transmission mode is the QPSK modulation, the processing proceeds to step S3. In this step S3, the control unit 38 demodulates the signal of the downlink data channel based on the QPSK manner, and controls the user data demodulating and decoding unit 39 so that this unit decodes the signal at the coding rate of R=½. Thereafter, the control unit 38 awaits the next control data to be supplied from the control data demodulating and decoding unit 37. The processing returns from step S3 to S1, and the same processing sequence is repeated in a similar manner.

At step S2, if it is determined that the modulation system indicated by the transmission mode is not the QPSK modulation, the processing proceeds to step S4. In this step S4, the control unit 38 examines whether the modulation system indicated by the transmission mode is the 16QAM and the coding rate indicated by the transmission mode is R=½ or not. At step S4, if it is determined that the modulation system indicated by the transmission mode is the 16QAM and the coding rate indicated by the transmission mode is R=½, then the processing proceeds to step S5. In this step S5, the control unit 38 demodulates the signal of the downlink data channel based on the 16QAM manner, and controls the user data demodulating and decoding unit 39 so that this unit decodes the signal at the coding rate of R=½. Thereafter, the control unit 38 awaits the next control data to be supplied from the control data demodulating and decoding unit 37. The processing returns from step S5 to S1, and the same processing sequence is repeated in a similar manner.

At step S4, if it is determined that the transmission mode information does not designate the combination of the modulation system of the 16QAM and the coding rate of R=½, the processing proceeds to step S6. In this step S6, the control unit 38 examines whether the modulation system indicated by the transmission mode is the 16QAM or not and whether the coding rate indicated by the transmission mode is R=¾ or not. At step S6, if it is determined that the modulation system indicated by the transmission mode is the 16QAM and the coding rate indicated by the transmission mode is R=¾, then the processing proceeds to step S7. In this step, the control unit 38 demodulates the signal of the downlink data channel based on the 16QAM manner, and controls the user data demodulating and decoding unit 39 so that this unit decodes the signal at the coding rate of R=¾. Thereafter, the control unit 38 awaits the next control data to be supplied from the control data demodulating and decoding unit 37. The processing returns from step S7 to S1, and the same processing sequence is repeated in a similar manner.

At step S6, if it is determined that the transmission mode information does not designate the combination of the modulation system of the 16QAM and the coding rate of R=¾, this determination means that the transmission mode information does not designate any of the three combinations of the modulation system and the coding rate as shown in FIG. 3. In this event, the control unit 38 determines that the transmission mode is erroneous one, and hence the control unit 38 takes no particular action in controlling the user data demodulating and decoding unit 39. Thus, the control unit 38 awaits the next control data to be supplied from the control data demodulating and decoding unit 37, and the processing returns from step S6 to S1, and the same processing sequence is repeated in a similar manner.

Now description will be again made with reference to FIG. 6. The data channel received signal quality estimating unit 35 estimates the SNR of the signal of the downlink data channel supplied from the inverse spreading unit 32. When the data channel received signal quality estimating unit 35 estimates the SNR, the data channel received signal quality estimating unit 35 utilizes a pilot symbol subjected to the time division multiplexing on the downlink data channel or a pilot channel symbol transmitted together with the downlink data channel in a parallel manner.

Although description is not provided yet with reference to FIG. 2, the spreading unit 11 effects the time division multiplexing on the predetermined pilot signal with the demodulated signal supplied from the adaptive coding and modulation unit 13. Thereafter, the spreading unit 11 carries out the spectrum spreading. Therefore, the signal of the downlink data channel contains the pilot signal. Further, the spreading unit 11 effects the spectrum spreading on another pilot signal with a spreading code different from a spreading code which is utilized for the effecting spectrum spreading on the demodulated signal supplied from the power adjusting unit 10 or the adaptive coding and modulation unit 13. Then, the pilot signal is supplied through the transmission/reception compatible unit 1 to the antenna 14 from which the pilot signal is transmitted through the downlink data channel and the downlink control channel in parallel.

The data channel received signal quality estimating unit 35 estimates the SNR of the signal of the downlink data channel supplied from the inverse spreading unit 32 by using the pilot signal contained in the signal or the pilot signal transmitted in parallel together with the signal of the downlink data channel. Then, the estimated SNR is supplied to the received signal quality message generating unit 36.

The received signal quality message generating unit 36 handles the estimated SNR of the downlink data channel supplied from the data channel received signal quality estimating unit 35 as the received signal quality at the terminal, and generates a received signal quality message of a predetermined message format so that the message indicates the received signal quality. Then, the received signal quality message generating unit 35 supplies the received signal quality message to the received signal quality message inserting unit 43.

In this case, the data channel received signal quality estimating unit 35 estimates the SNR of the downlink data channel for each frame and the received signal quality message generating unit 36 generates the received signal quality message also for each frame.

On the other hand, the user data demodulating and decoding unit 39 carries out decoding and demodulation on the signal of the downlink data channel supplied from the inverse spreading unit 32 under the control of the control unit 38 which is described with reference to FIG. 7. The resultant user data obtained by the operation is supplied to the error detecting unit 40. When the user data demodulating and decoding unit 39 decodes the signal of the downlink data channel, the user data demodulating and decoding unit 39 carries out user data error correction by using the error correction code contained in the signal as a redundancy bit.

The error detecting unit 40 carries out a parity detection by using Cyclic Redundancy Check (CRC), for example. That is, the error detecting unit 40 examines whether the user data decoded by the user data demodulating and decoding unit 39 contains any error or not, and the error detecting unit 40 supplies the result of the examination to the retransmission request message generating unit 41 and the received signal buffer 46.

If the retransmission request message generating unit 41 receives an examination result indicating that there is no error contained therein from the error detecting unit 40, then the retransmission request message generating unit 41 generates a message having a value of "0", for example, and supplies the message to the retransmission request message inserting unit 42. Conversely, if the retransmission request message generating unit 41 receives an examination result indicating that there is some error contained therein from the error detecting unit 40, then the retransmission request message generating unit 41 generates a message having a value of "1", for example, and supplies the message to the retransmission request message inserting unit 42.

The retransmission request message inserting unit 42 carries out framing on the retransmission request message supplied from the retransmission request message generating unit 41 with the signal of the uplink control channel described with reference to FIG. 1, and supplies the resultant signal to the received signal quality message inserting unit 43. The received signal quality message inserting unit 43 carries out framing on the received signal quality message supplied from the received signal quality message generating unit 36 with the signal of the uplink control channel supplied from the retransmission request message inserting unit 42. The resultant signal is supplied to the power control bit inserting unit 44. The power control bit inserting unit 44 carries out framing on the power control bit supplied from the power control bit generating unit 34 with the signal of the uplink control channel supplied from the received signal quality message inserting unit 43. The resultant signal is supplied to the spreading unit 45. The spreading unit 45 effects the spectrum spreading on the signal of the uplink control channel transmitted from the power control bit inserting unit 44, and supplies the resultant signal obtained by the operation to the transmission/reception compatible unit 31.

The transmission/reception compatible unit 31 effects a necessary processing on the spread signal transmitted from the spreading unit 45 and transmits the signal through the antenna 47.

On the other hand, as described above, the user data demodulating and decoding unit 39 demodulates the signal of the downlink data channel and decodes coded data obtained as a result of the demodulation. However, the user data demodulating and decoding unit 39 carries out another operation than the decoding of the coded data as described above. That is, user data demodulating and decoding unit 39 supplies the coded data to the received signal buffer 46.

The received signal buffer 46 temporarily stores therein the coded data supplied from the user data decoding unit 39 and supplies the stored coded data to the user data demodulating and decoding unit 39 under control of the control unit 38.

That is, if any error is detected in the user data disposed in the downlink data channel, the retransmission request message generating unit 41 generates a retransmission request message requesting a signal retransmission, as described above. This retransmission request message is disposed in the uplink control channel and transmitted.

When the base station having the arrangement illustrated in FIG. 2 receives the retransmission request message requesting the signal retransmission, as described above, the base station again transmits the user data (i.e., packet data having the user data disposed therein) identical to that transmitted upon the previous transmission step.

When the base station again transmits the user data, the signal of the downlink data channel containing the user data carried out the retransmission process is transmitted to the antenna 47, the transmission/reception compatible unit 31 and the inverse spreading unit 32 in which processing similar to those described above are carried out. Thereafter, the resulting signal is supplied to the user data demodulating and decoding unit 39.

Further, when the base station retries to transmit the user data, as described with reference to FIG. 2, the control data is made to contain a retransmission flag indicating that the transmission is a retransmitted one. When the control unit 38 recognizes that the control data contains the retransmission flag, the control unit 38 controls the received signal buffer 46 so that the received signal buffer supplies the coded data corresponding to the user data concerning the retransmission stored in the received signal buffer 46 to the user data demodulating and decoding unit 39.

Accordingly, when the user data is again transmitted to the terminal, the user data demodulating and decoding unit 39 is supplied with the signal of the downlink data channel having the user data concerning the retransmission disposed therein from the inverse spreading unit 32. In addition, the user data demodulating and decoding unit 39 is supplied with the coded data corresponding to the user data concerning the retransmission from the received signal buffer 46.

If the control data contains the retransmission flag, the control unit 38 controls the received signal buffer 46 in a manner as described above. Also the control unit 38 controls the user data demodulating and decoding unit 39 so that the user data demodulating and decoding unit 39 synthesizes the coded data.

In this case, the user data demodulating and decoding unit 39 demodulates the signal of the downlink data channel having the user data concerning the retransmission disposed therein to obtain the coded data. Thereafter, the user data demodulating and decoding unit 39 synthesizes the coded data of the retransmission with the coded data supplied from the received signal buffer 46 so as to obtain coded data in which larger energy is allocated to each one-bit amount of the user data. The coded data is supplied from the user data demodulating and decoding unit 39 to the received signal buffer 46 and stored in the received signal buffer 46 in a manner of overwriting, for example. Further, the user data demodulating and decoding unit 39 decodes the coded data having the larger energy allocated to each one-bit amount of the user data to restore the user data, and supplies the same to the error detecting unit 40.

As described above, the error detecting unit 40 examines whether the user data supplied from the user data demodulating and decoding unit 39 contains any error or not. If it is determined that there is no error contained therein, the detecting unit 40 outputs the result of the examination. The result of determination indicating no error is also supplied to the received signal buffer 46 in addition to the retransmission request message generating unit 41.

When the received signal buffer 46 receives the result of the examination indicating that there is no error contained in the user data, the received signal buffer 46 clears the coded data stored therein corresponding to the user data which is confirmed that there is no error contained therein.

As described above, if it is determined that the user data contains any error, the terminal requests the base station to send the signal again, synthesizes the data concerning the retransmission and the data received in the previous step together, and allocates larger energy to each one-bit amount of the user data by using the synthesized gain deriving from the synthesizing operation, whereby the error contained in the user data is restored. This series of signal retransmission scheme is the Hybrid-ARQ.

According to the adaptive coding and modulation system, the data transmission speed can be varied in accordance with the received signal condition (received signal quality) at the terminal. Therefore, the data is able to be transmitted to the terminal side efficiently.

Meanwhile, in the above arrangement, the base station determines whether it is necessary to retry signal transmission depending on the retransmission request message transmitted from the terminal. The data of the retransmission is synthesized with the data transmitted in the previous step. Therefore, if coincidence or any improvement is found between the initial data transmission and the current data transmission in the received signal quality, then it is expected that the signal to interference ratio is improved and the transmission efficiency can be also improved. In the actual practice, however, there can be brought about a situation in which the propagation path is deteriorated at the data retransmission time as compared with at the initial data transmission time. In such a situation, there can be taken place in which synthesizing the data of retransmission with data of a previous step does not bring an improvement in the transmission efficiency (i.e., no gain can be obtained by synthesizing the data of the retransmission).

Furthermore, there can be brought about a situation in which, contrary to the above case, improvement is found in the propagation path characteristic upon retransmitting the data as compared with upon the initial data transmission. This fact follows that the data of retransmission is transmitted by using an excessive energy, and resultantly the radio communication resources are to be consumed uselessly.

DISCLOSURE OF THE INVENTION

The present invention is made in view of the above aspect. Therefore, it is an object of the present invention to propose a solution in which a transmission parameter is controlled depending on the received signal quality at the terminal, so that a retransmission achieving no gain is reduced and useless radio communication resources are suppressed, whereby transmission efficiency can be improved.

According to the present invention, there is provided a transmission apparatus characterized by including differential information calculating means for carrying out calculation to obtain differential information regarding the difference in the received signal qualities at the terminal and control means for controlling a transmission parameter upon transmitting the data to the terminal based on the differential information.

According to the present invention, there is provided a method for controlling signal transmission characterized by including steps of calculating differential information to obtain differential information regarding the difference in the received signal qualities at the terminal, and controlling a transmission parameter upon transmitting the data to the terminal based on the differential information.

According to the present invention, there is provided a program characterized by including comprising steps of calculating differential information to obtain differential information regarding the difference in the received signal qualities at the terminal, and controlling a transmission parameter upon transmitting the data to the terminal based on the differential information.

According to the transmission apparatus, the method for controlling signal transmission, and the program of the present invention, the differential information concerning the difference between the received signal qualities at the terminal, and the transmission parameter upon transmitting data to the terminal is controlled based on the difference information.

BRIEF DESCRIPTION OF THE DRAWINGS

FIG. 3 is a diagram showing examples of transmission modes;

FIG. 4A is a diagram illustrating the mapping of the data in accordance with a QPSK modulation system;

FIG. 4B is a diagram illustrating the mapping of the data in accordance with a 16QAM modulation system;

FIG. 15 is a flowchart showing a fifth embodiment of a retransmission processing; and FIG. 16 is a block diagram showing an example of an arrangement of one embodiment as a computer to which the present invention is applied.

BEST MODE FOR CARRYING OUT THE INVENTION

Figure 1:
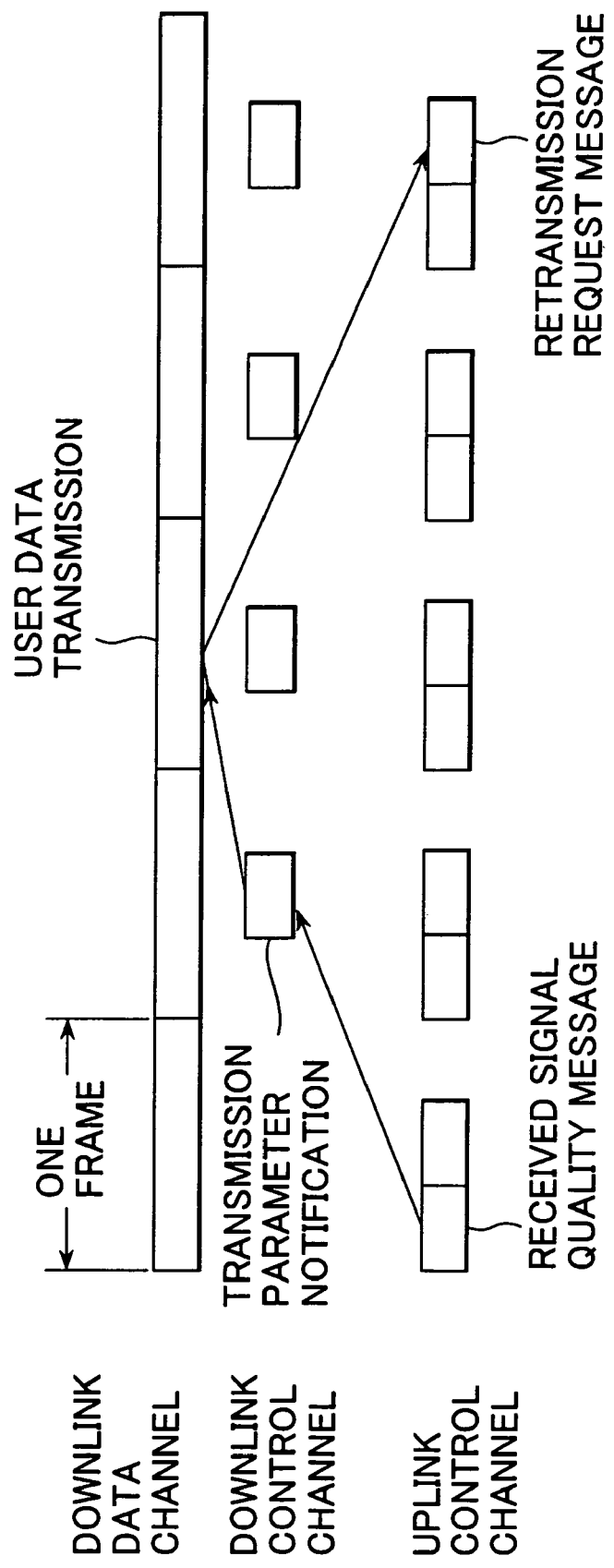
FIG. 1 is a diagram for explaining a conventional manner of data transmission.
Figure 2:
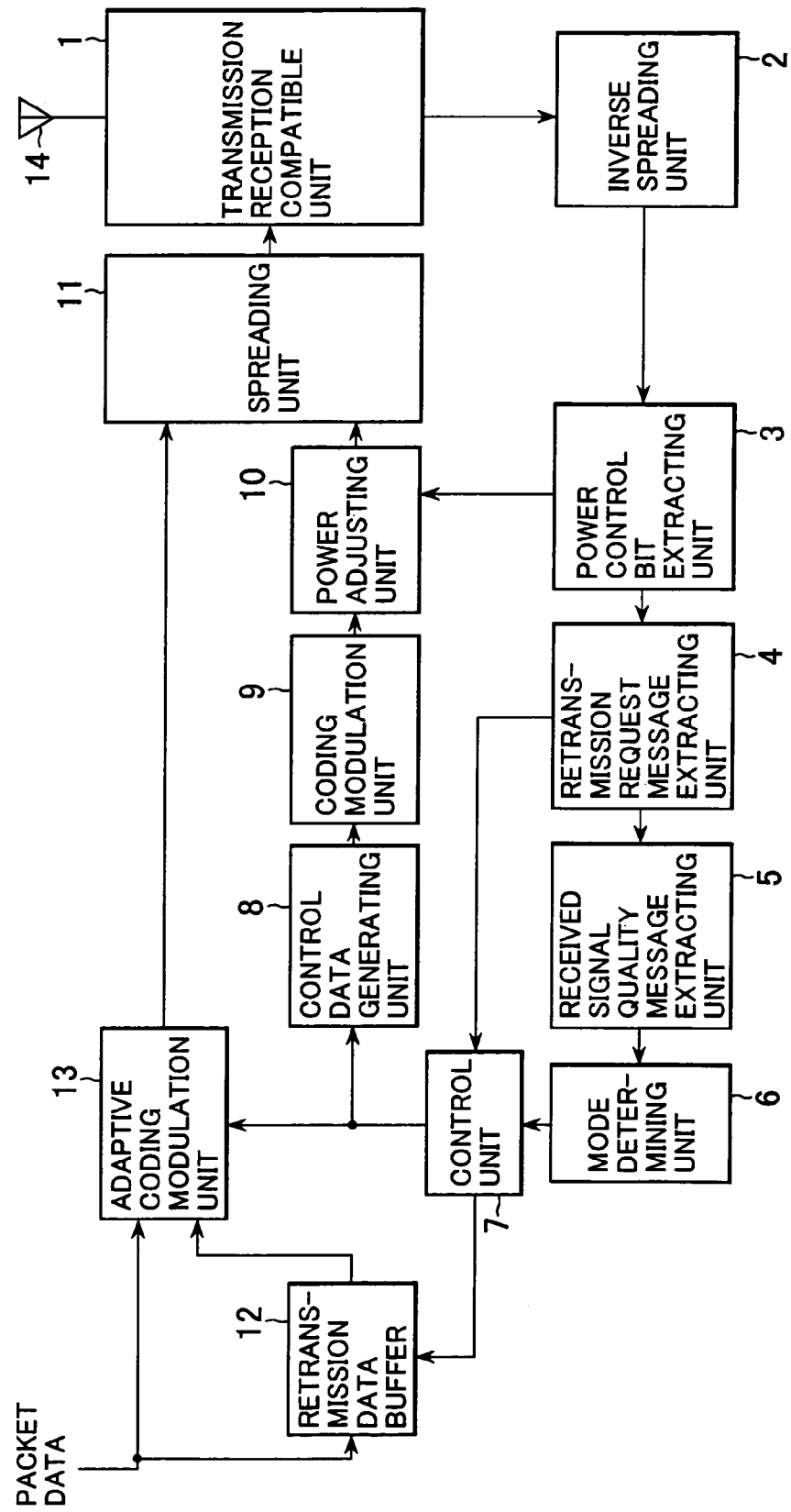
FIG. 2 is a block diagram showing one example of an arrangement of a conventional base station.
Figure 5:
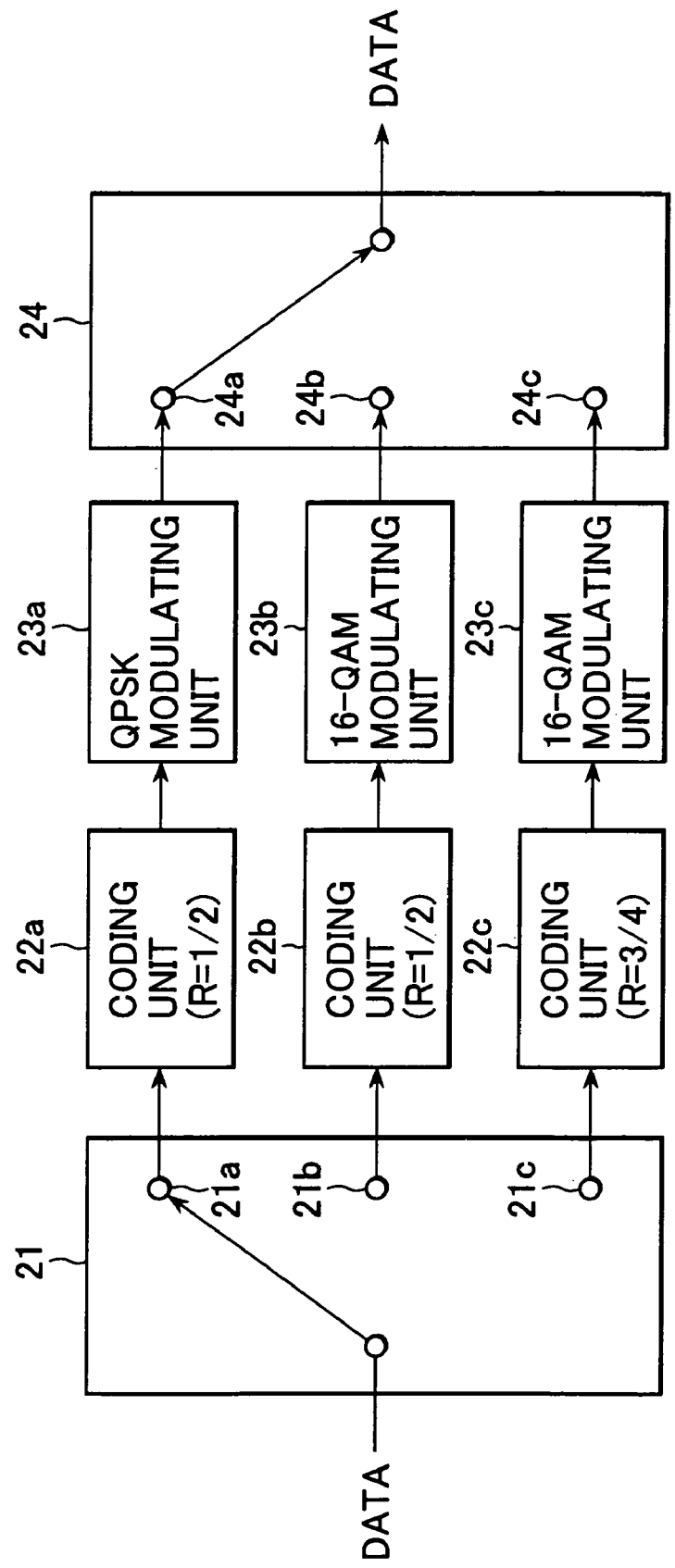
FIG. 5 is a block diagram showing an example of an arrangement of an adaptive coding and modulation unit 13.
Figure 8:
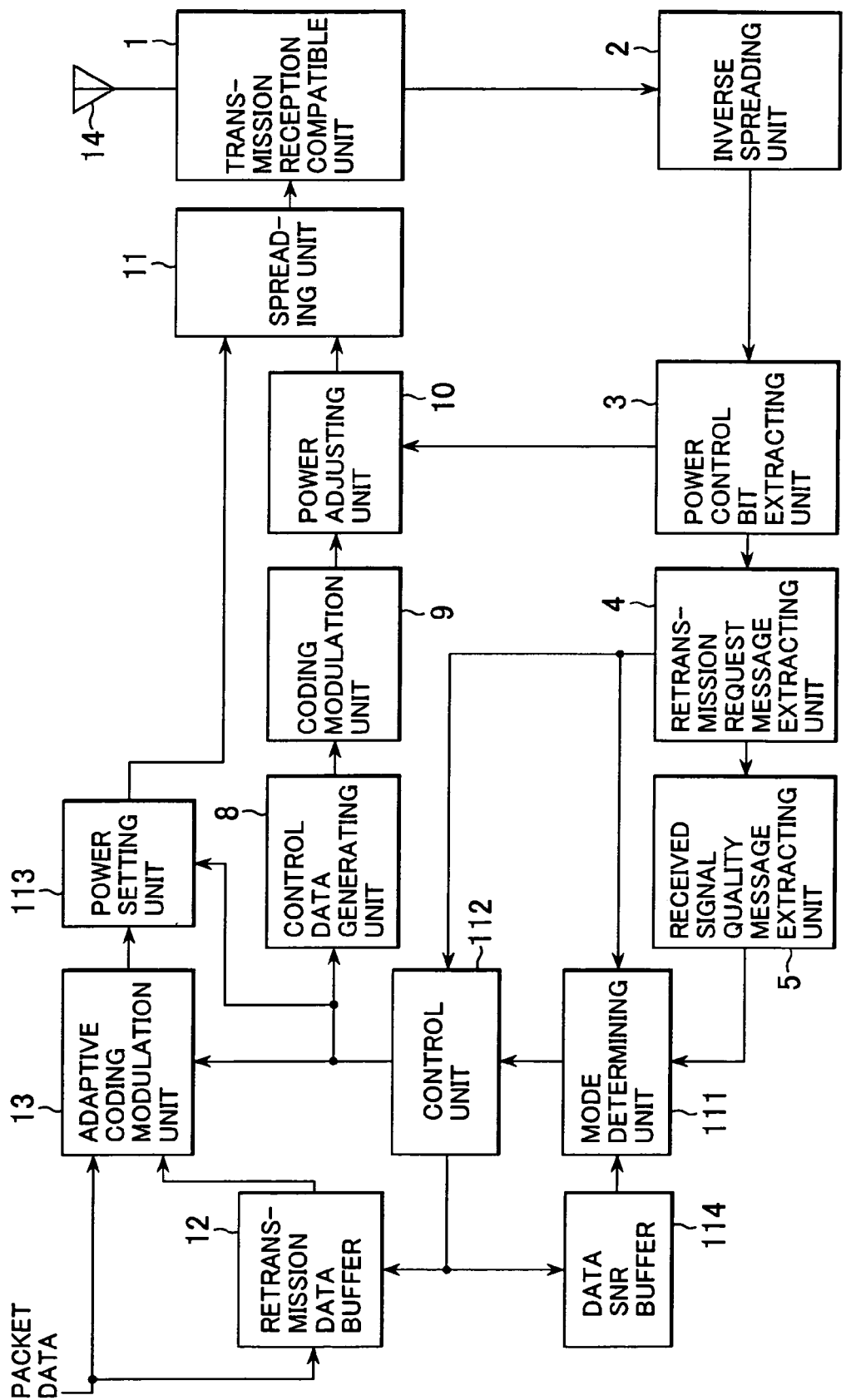
FIG. 8 is a block diagram showing an example of an arrangement of one embodiment of a base station to which the present invention is applied.

FIG. 8 is a diagram showing an example of an arrangement of one embodiment of a base station (apparatus) to which the present invention is applied. In this figure, like parts corresponding to those parts in FIG. 2 are identified by the same reference numerals. Therefore, they will not be described in the following description.

As shown in FIG. 8, the base station is arranged to include a transmission/reception compatible unit 1, an inverse spreading unit 2, a power control bit extracting unit 3, a retransmission request message extracting unit 4, a mode request message extracting unit 5, a mode determining unit 111, a control unit 112, a control data generating unit 8, a coding and modulation unit 9, a power adjusting unit 10, a spreading unit 11, a data buffer 12, an adaptive coding and modulation unit 13, a power setting unit 113, and a data SNR buffer 114.

Accordingly, the base station shown in FIG. 8 has the mode determining unit 111 and the control unit 112 provided in lieu of the mode determining unit 6 and the control unit 7. Further, the base station is additionally provided with the power setting unit 113 and the data SNR buffer 114. Remaining components constituting the base station are arranged in a fundamentally similar manner as those of the base station shown in FIG. 2.

The mode determining unit 111 determines the transmission mode based on the received signal quality message supplied from the received signal quality message extracting unit 5 and the resources of the base station in a manner similar to that of the mode determining unit 6 shown in FIG. 2. Further, the mode determining unit 111 is supplied with the retransmission request message from the retransmission request message extracting unit 4. If the mode determining unit 111 receives a retransmission request message requesting a retransmission, the mode determining unit carries out arithmetic operation to determine the difference between the received signal quality at the current step (current received signal quality) indicated by the received signal quality supplied from the received signal quality message extracting unit 5 and the received signal quality of a previous step stored in the data SNR buffer 114. Then, the mode determining unit supplies the difference between the received signal qualities (hereinafter sometimes referred to as received signal quality difference) to the control unit 112. Further, the mode determining unit 111 determines the transmission mode based on the received signal quality difference depending on necessity. Furthermore, the mode determining unit 111 supplies the received signal quality at the current step indicated by the received signal quality message supplied from the received signal quality message extracting unit 5 to the control unit 112.

Similarly to the control unit 6 shown in FIG. 2, the control unit 112 controls the retransmission data buffer 12 in accordance with the retransmission request message supplied from the retransmission request message extracting unit 4. Also, the control unit 112 controls the transmission parameter of the adaptive coding and modulation unit 13, i.e., the coding rate and the modulation system, in accordance with the transmission mode information supplied from the mode determining unit 111. Further, similarly to the control unit 6 shown in FIG. 2, the control unit 112 supplies information necessary for generating control data to the control data generating unit 8. Further, the control unit 112 controls the transmission parameter of the power setting unit 113, i.e., the transmission power of a signal outputted from the adaptive coding and modulation unit 13, based on the difference information supplied from the mode determining unit 111. The control unit 112 supplies the received signal quality of the current step supplied from the mode determining unit 111 to the data SNR buffer 114 depending on the necessity. Furthermore, the control unit 112 updates the received signal quality information stored in the data SNR buffer 114 depending on necessity.

The power setting unit 113 adjusts the transmission power of the signal outputted from the adaptive coding and modulation unit 13 in accordance with the control of the control unit 112 and supplies the same to the spreading unit 11.

The data SNR buffer 114 stores therein the information of the received signal quality supplied from the control unit 112 or other information like that.

The base station shown in FIG. 8 carries out control operations which are different from the conventional manner of control. The different points are itemized as follows.

1. When new data is to be transmitted, the control unit 112 reserves a received signal quality message received in a time slot of the transmitted data in the data SNR buffer 114.

2. If the retransmission request message extracted by the retransmission request message extracting unit 4 indicates a request of retransmission, then the mode determining unit 111 executes the following operations.

2-(1) To acquire the received signal quality Qprv by transferring the same from the data SNR buffer 114.

2-(2) To compare the received signal quality Qprv of the previous step with the received signal quality Qnow of the current report.

2-(3) If it is determined that the received signal quality Qnow is degraded by a predetermined threshold value THx [dB] (DeciBel) with respect to the received signal quality Qprv of the previous step, the mode determining unit determines that it is necessary to change the transmission parameter. Thus, the following processing of No. 3 or 4 is carried out. If the determination takes any mode other than the above one, the mode determining unit determines that it is unnecessary to change the transmission parameter. Thus, the following processing of No. 5 is carried out.

3. If there is an allowance to increase the transmission power by y dB, the data retransmission is tried in the following manner. In this case, y is given by an expression (past received signal quality Qprv−current received signal quality Qnow−THx).

3-(1) The transmission power is increased by Pup amount where the value of Pup is one satisfying equations of ydB≦Pup≦Pavl. In this case, the value of Pup is the maximum amount of resources allowable to be assigned to a single user at this timing point.

3-(2) In this case, the mode determining unit selects a modulation system and a coding rate which are identical to those used in the previous step, respectively.

3-(3) To update the value of the received signal quality Qprv stored in the data SNR buffer 114. The updated received signal quality Qprv derives from an operation of Qprv←Qprv+Qnow+Pup. Therefore, if Pup=y, the past received signal quality is updated by being replaced with 2Qprv−THx.

3-(4) Transmission is made through the downlink control channel to the terminal so as to inform the terminal that the transmission data is a retransmission data, the modulation system and the coding system (coding rate) are same as those employed when the user data was transmitted in the previous step. In this case, the terminal is allowed to synthesize the data temporarily stored in the received signal buffer 46 (FIG. 6) with the retransmission data. Since the terminal has the same arrangement as that described with reference to FIG. 6, the description thereof will not be made.

3-(5) The user data is again transmitted.

4. If there is no allowance to increase the transmission power by y dB, the data retransmission is tried in the following manner. In this case, similarly to the above-described case, y is given by an expression (past received signal quality Qprv−current received signal quality Qnow−THx).

4-(1) The modulation system and the coding system is selected depending on the current received signal quality Qnow.

4-(2) The value Qprv stored in the data SNR buffer 114 is updated by changing into the current received signal quality Qnow.

4-(3) Transmission is made through the downlink control channel so as to inform that the transmission data is a retransmission data, the modulation system and the coding system (coding rate) are different from those employed when the user data is transmitted in the previous step. In this case, the terminal does not synthesize the data stored in the received signal buffer 46 with the transmitted data.

4-(4) The user data is again transmitted.

5. The data retransmission is tried in the following manner.

5-(1) The mode determining unit selects a transmission power, a modulation system and a coding rate which are identical to those used when the user data was transmitted in the previous step, respectively.

5-(2) The value of data SNR buffer 114 Qprv is updated by being replaced with past received signal quality Qprv+ current received signal quality value Qnow.

5-(3) Transmission is made through the downlink control channel so as to inform that the transmission data is a retransmission data, the modulation system and the coding system are the same as those employed when the user data was transmitted in the previous step. In this case, the terminal is allowed to synthesize the data stored in the received signal buffer 46 with the transmitted data.

5-(4) The user data is again transmitted.

Figure 9:
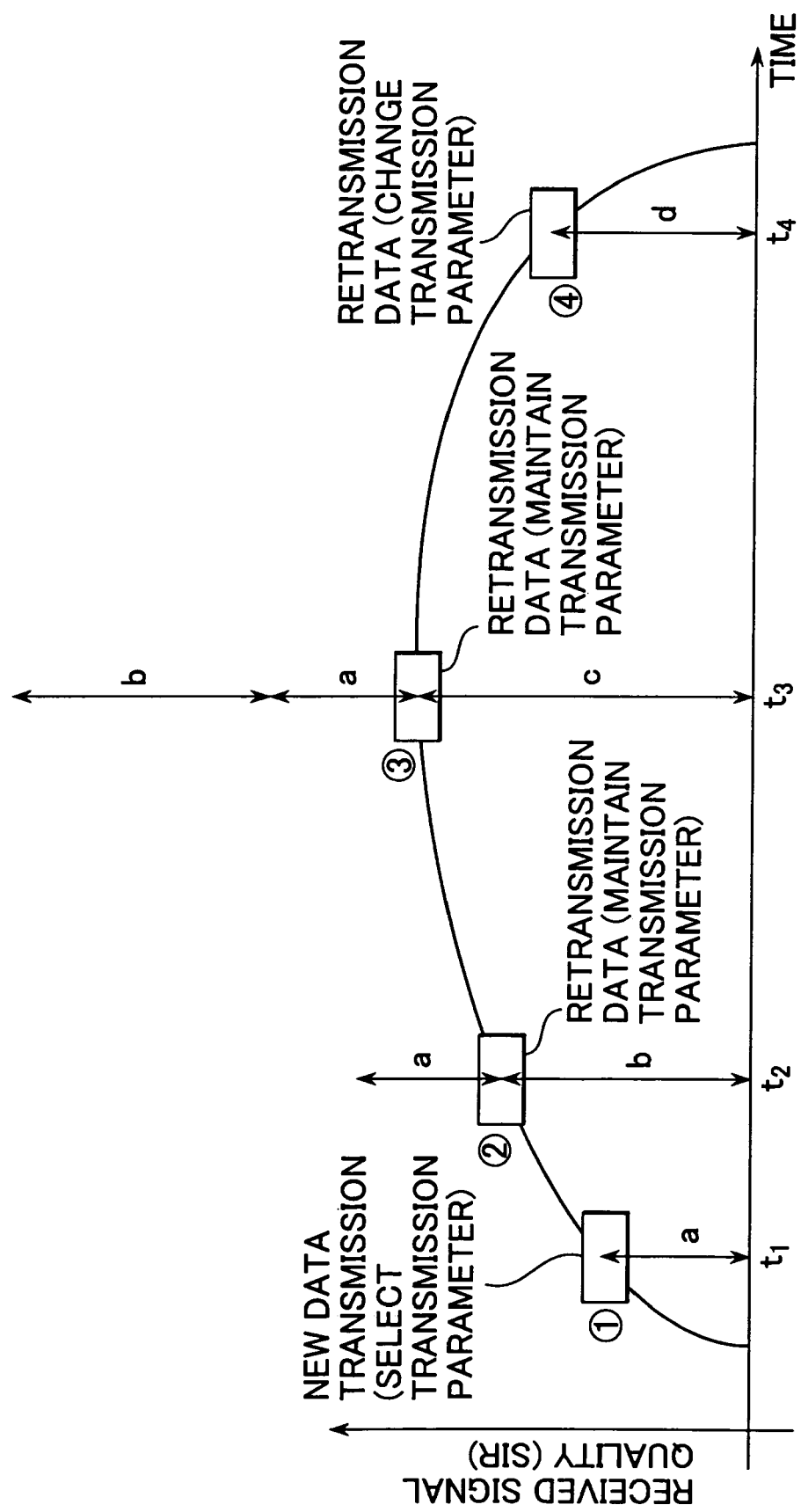
FIG. 9 is a diagram showing a specific example of a relation between the data retransmission processing and the received signal quality.

FIG. 9 illustrates a relationship between the data retransmission carried out in the base station of FIG. 8 and the received signal quality at the terminal.

In FIG. 9, reference ① represents a step of transmitting new data by using a certain transmission parameter. A reference a is taken as the received signal quality Qnow at this time. In the example shown in FIG. 9, it is determined in the terminal that the data transmitted in the first transmission contains some error. Therefore, it is assumed that the terminal transmits a NACK signal to the base station. In this case, the NACK signal means a retransmission request message requesting that a transmission shall be retried.

The case of step ② holds an expression of inequality, a(Qpvr)<b(Qnow)+THx. Thus, the aforementioned retransmission processing of No. 5 is carried out. The retransmission data is again transmitted by using a parameter identical to that of the step of ①. The updated receive signal quality at the step of ② is Qprv+Qnow, and hence it becomes a+b.

In the case of FIG. 9, some error is detected in the retransmission data of ② on the side of terminal. Therefore, the terminal transmits a NACK signal to the base station, and the identical data is again transmitted at the step of ③. Also the step ③ holds an expression of inequality, a+b(Qpvr)<c(Qnow)+THx. Thus, the aforementioned retransmission processing of No. 5 is carried out. The retransmission data is again transmitted by using a parameter identical to that of the step of ①. The updated receive signal quality at the step of ③ is Qprv+Qnow, and hence it becomes a+b+c.

Also, in the case of FIG. 9, some error is detected in the retransmission data of ③ on the side of terminal. Therefore, the terminal transmits a NACK signal to the base station. However, the case of ④ holds an expression of inequality, a+b+c (Qpvr)>d(Qnow)+THx. Thus, the aforementioned retransmission processing of No. 3 and 4 are carried out. Which processing is carried out is determined depending on whether there is power allowable to allocate at the timing point of, i.e., whether the situation holds an expression of inequality, power allowable to be allocated (Pavl)>a+b+c (Qpvr)−d(Qnow)−THx or not.

If sufficient power allowance is prepared, a kind of transmission parameter, i.e., the transmission power is increased and the data transmission is retried at the same transmission mode (i.e., the coding rate and the modulation system) as that of the previous step. At this time, the received signal quality is updated in such a manner that Qprv+Qnow+Pup=a+B+c+d+ Pup. If Pup=y, then y=a+b+c−d−THx. Therefore, the updated received signal quality becomes 2(a+b+c)−THx.

If there is no sufficient power prepared, of the transmission parameter, the transmission mode (coding rate and the modulation system) is determined based on the current received signal quality d. Then, the received signal quality Qprv stored in the data SNR buffer 114 is updated by being replaced with the current received signal quality d, and the retransmission data is transmitted to the terminal as new data.

As described above, since the transmission parameter upon retrying the transmission is altered under consideration of the synthesized gain upon retrying the transmission, an effective retransmission system can be provided and the redio communication resources can be effectively utilized. Further, since the received signal quality message for use in the adaptive modulation and coding system is utilized to compare the received signal quality at the current timing point with the received signal quality at the past transmission, it becomes possible to estimate accurately the synthesizing gain of the retransmission data.

Now the processing of the base station of FIG. 8 will be further described with reference to FIG. 10.

Initially, at step S11, the base station receives a signal transmitted from the terminal through the uplink control channel.

That is, the signal transmitted from the terminal through the uplink control channel is received at the antenna 14 and supplied through the transmission/reception compatible unit 1 and the inverse spreading unit 2 to the power control bit extracting unit 3.

The processing proceeds to step S12 in which the power control bit extracting unit 3 extracts the power control bit from the signal of the uplink control channel supplied thereto and supplies the power control bit to the power adjusting unit 10. Also, the power control bit extracting unit 3 supplies the signal of the uplink control channel to the retransmission request message extracting unit 4. Thus, the processing proceeds to step S14.

At step S14, the retransmission request message extracting unit 4 extracts the retransmission request message from the signal of the uplink control channel supplied thereto, and supplies the retransmission request message to the mode determining unit 111 and the control unit 112. Also, the retransmission request message extracting unit 4 supplies the signal of the uplink control channel to the received signal quality message extracting unit 5. Further, in step S14, the mode determining unit 11 and the control unit 112 examine whether the retransmission request message supplied from the retransmission request message extracting unit 4 is the one requesting the retransmission or not.

At step S14, if it is determined that the retransmission request message is one requesting the retransmission, then the processing proceeds to step S20 in which retransmission processing, which will be described later on, is carried out and the processing returns to step S11.

Conversely, at step S14, if it is determined that the retransmission request message is one not requesting the retransmission, then the processing proceeds to step S15 in which the received signal quality message extracting unit 5 extracts the received signal quality message from the signal of the uplink control channel supplied from the retransmission request message extracting unit 4. Then, the retransmission request message is supplied to the mode determining unit 111 and the processing proceeds to step S16.

At step S16, the mode determining unit 111 determines the coding rate and the modulation system (transmission mode) at the adaptive coding and modulation unit 13 based on the current received signal quality at the terminal which is represented by the received signal quality message supplied from the received signal quality message extracting unit 5.

That is, the mode determining unit 111 determines the transmission mode so that, for example, the error rate on the side of the terminal becomes equal to or smaller than a predetermined value based on the current received signal quality at the terminal.

Further, in the step S16, the mode determining unit 111 supplies the determined transmission mode information together with the current received signal quality at the terminal to the control unit 112. Then, the processing proceeds to step S17.

At step S17, the control unit 112 supplies the transmission mode information supplied from the mode determining unit 111 to the control data generating unit 8, and the control data generating unit 8 makes the transmission mode information be included in the transmission parameter indicative of various parameters of the base station upon transmission. Thus, the control data generating unit 8 generates control data containing the transmission parameter. The control data is supplied from the control data generating unit 8 through the coding and modulation unit 9, the power adjusting unit 10, the spreading unit 11 and the transmission/reception compatible unit 8 to the antenna 14. Then, the control data is transmitted as a signal of the downlink control channel.

Thereafter, the processing proceeds to step S18 in which the control unit 112 supplies the transmission mode information supplied from the mode determining unit 111 and the information of the current received signal quality at the terminal to the data SNR buffer 114 in which the transmission mode information and the current received signal quality information are stored in an overwriting manner. Then, the processing proceeds to step S19.

At step S19, new user data for the terminal is transmitted at the transmission mode determined by the mode determining unit 111.

That is, at step S19, the new user data for the terminal is disposed in a packet and supplied to the adaptive coding and modulation unit 13 as a packet data. The new user data is also supplied to the retransmission data buffer 12 and stored therein so that the new user data can respond to the retransmission request.

The control unit 112 controls the adaptive coding and modulation unit 13 so that the new user data for the terminal is subjected to the coding process and modulation process of the transmission mode which is determined by the mode determining unit 111. The adaptive coding and modulation unit 13 encodes and modulates the user data for the terminal supplied thereto in accordance with the control of the control unit 112, and supplies the resultant data to the power setting unit 113. The power setting unit 113 adjusts the transmission power for transmuting a signal outputted from the adaptive coding and modulation unit 13 so that the transmission power comes to have a value identical to that utilized upon transmitting the user data in the previous time, and then supplies the resultant value to the spreading unit 11. The spreading unit 11 and the transmission/reception compatible unit 1 carry out the processing similar to those described with reference to FIG. 2 in the following steps. As a consequence, the user data is transmitted as a signal of the downlink data channel from the antenna 14 to the terminal.

As described above, the user data is transmitted. After transmitting the user data, the processing returns to step S11 and the similar processing is repeated in the following steps.

Next, the retransmission processing at step S20 in FIG. 10 will be described with reference to a flowchart of FIG. 11.

Figure 10:
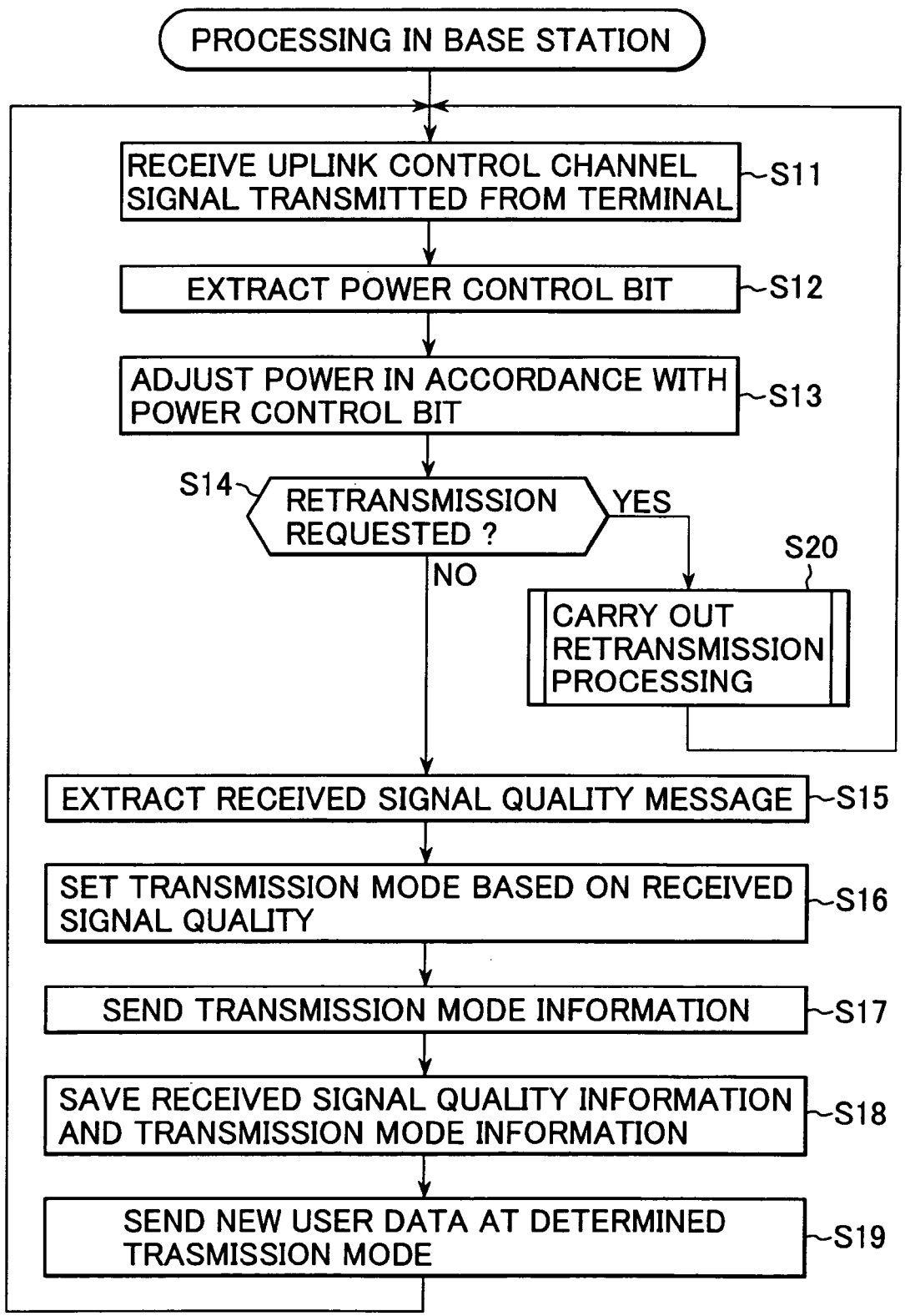
FIG. 10 is a flowchart for explaining a processing at the base station.

In this retransmission processing, initially, at step S31, similarly to step S15 of FIG. 10, the received signal quality message extracting unit 5 extracts the received signal quality message from the signal of the uplink control channel supplied from the retransmission request message extracting unit 4, and supplies the message to the mode determining unit 111. Further, in step S31, the mode determining unit 111 recognizes the current received signal quality at the terminal represented by the received signal quality message supplied from the received signal quality message extracting unit 5 as the received signal quality Qnow of this time representing the received signal quality at the terminal upon transmitting the data in this time. Then, the processing proceeds to step S32.

At step S32, the mode determining unit 111 reads the received signal quality information stored in the data SNR buffer 114 as the received signal quality Qprv in the previous time representing the received signal quality at the terminal upon the previous data transmission.

According to the processing illustrated in the flowchart of FIG. 10, each time the received signal quality message extracting unit 5 extracts the received signal quality message at step S15, the received signal quality represented by the received signal quality message is stored in the data SNR buffer 114 in an overwriting manner at step S18. Accordingly, when the processing of step S11 to step S19 of FIG. 10 is repeated, the received signal quality message extracting unit 5 extracts the last received signal quality message, and the data SNR buffer 114 retains therein the received signal quality information (the previous received signal quality information) represented by the received signal quality message extracted in the previous time until the received signal quality information represented by the last received signal quality message is overwritten.

After executing step S32, the processing proceeds to step S33 in which the mode determining unit 111 examines whether or not the current received signal quality Qnow is deteriorated as compared with the previous received signal quality Qprv. That is, the mode determining unit 11 calculates the received signal difference Qprv−Qnow which means the difference between the previous received signal quality Qprv and the current received signal quality Qnow, and examines whether or not the received signal difference Qprv−Qnow is larger than a predetermined threshold value THx equal to or more than 0 dB, for example.

At step S33, if it is determined that the received signal difference Qprv−Qnow is larger than a predetermined threshold value THx, and hence the current received signal quality Qnow is deteriorated as compared with the previous received signal quality Qprv, the mode determining unit 111 supplies the result of the determination together with the previous received signal quality Qprv and the current received signal quality to the control unit 112. Then, the processing proceeds to step S34.

At step S34, the control unit 112 carries out calculation to obtain the maximum transmission power Pavl of the downlink data channel that is now allowed to be newly allocated to a single user, and the processing proceeds to step S35. At step S35, the control unit 112 estimates a necessary minimum increased power amount y as a minimum increase amount of transmission power of the downlink data channel which is necessary for the terminal to receive the user data with no error, by calculating an equation of y=Qprv−Qnow−THx, for example.

In this case, the equation for estimating the necessary minimum increased power amount y is not limited to the above-mentioned one but an equation of y=Qprv−Qnow or the like can be employed.

Thereafter, the processing proceeds to step S36 in which the control unit 112 examines whether or not the necessary minimum increased power amount y is equal to or smaller than the maximum transmission power Pavl that is allowed to be additionally allocated. At step S36, if the necessary minimum increased power amount y is equal to or smaller than the maximum transmission power Pavl that is allowed to be additionally allocated, then the processing proceeds to step S37 in which the control unit 112 sets an increased power amount Pup as an increased power amount of the transmission power of the downlink data channel so that the increased power amount satisfies an expression of y≦Pup≦Pavl. Then, the processing proceeds to step S38.

In this case, from the standpoint for seeking effective utilization of the resources in the base station, it is desirable for the increased power amount Pup to be set to the necessary minimum increased power amount y. Further, from the standpoint of putting a greater importance on that the terminal can satisfactorily receive the user data, it is desirable for the increased power amount Pup to be set to the maximum transmission power Pavl that is allowed to be additionally allocated (or any value approximate to this value).

At step S38, the control unit 112 controls the power setting unit 113 so that the transmission power of the downlink data channel as one of the transmission parameters is increased by increased power amount of Pup. Then, the processing proceeds to step S39.

At step S39, the mode determining unit 111 refers to the data SNR buffer 114 to recognize the transmission mode upon transmitting the user data in the previous time (transmission mode upon transmitting the user data as an object of the retransmission in the previous time) (hereinafter preferably referred to as previous transmission mode). Then, the mode determining unit 111 determines so that the transmission mode for the current user data transmission (retransmission) is identical to the previous transmission mode. Further, at step S39, the mode determining unit 111 supplies the determined transmission mode information to the control unit 112 and the processing proceeds to step S40.

At step S40, the control unit 112 updates the previous received signal quality Qprv stored in the data NSAR buffer 114 by effecting replacement of Qprv=Qprv+Qnow+Pup. This updated data is supplied to the data SNR buffer 114 and written therein in an overwriting manner.

In the above-mentioned situation, the user data is again going to be transmitted at the transmission power of the downlink data channel which is increased by the increased power amount of Pup with respect to the current transmission power. At this time, as described with reference to FIG. 6, the terminal synthesizes the user data (encoded data) which is going to be retransmitted and the user data transmitted in the previous step together. Therefore, it is estimated that the energy per bit of the synthesized user data comes to have a value deriving from the sum of the energy per bit of the user data received in the previous step and the energy corresponding to the current received signal quality Qnow and the increased power amount Pup. Accordingly, it is expected that, with the user data retransmission, the received signal quality at the terminal is improved to be a value deriving from the sum of the previous received signal quality Qprv and the current received signal quality Qnow added with the increased power amount Pup. As a consequence, at step S40, the control unit 112 updates the previous received signal quality Qprv by effecting replacement of Qprv=Qprv+Qnow+Pup.

At step S40, the control unit 112 supplies the transmission mode information supplied from the mode determining unit 111 to the control data generating unit 8 together with the retransmission flag. The control data generating unit 8 makes the transmission mode information and the retransmission flag be included in the transmission parameter indicative of various parameters of the base station upon transmission. Thus, the control data containing the transmission parameter is created. This control data is supplied from the control data generating unit 8 through the coding and modulation unit 9, the power adjusting unit 10, the spreading unit 11 and the transmission/reception compatible unit 1 to the antenna 14. Then, the control data is transmitted from the antenna 14 as a signal of the downlink control channel.

The processing proceeds to step S41 in which the user data of the retransmission to the terminal is transmitted at the transmission mode which is determined by the mode determining unit 111. Then, the processing returns.

That is, as described with reference to FIG. 10, the user data for the terminal is supplied to the adaptive coding and modulation unit 13 and also supplied to the retransmission data buffer 12 and stored therein. In step S41, the control unit 112 controls the retransmission data buffer 12 so that the user data stored (i.e., user data transmitted through the downlink data channel in the previous step and placed under the retransmission step) is supplied to the adaptive coding and modulation unit 13 as retransmission data to be transmitted again to the terminal. The control unit 112 controls the adaptive coding and modulation unit 13 so that the retransmission data is encoded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 increases the transmission power of the signal outputted from the adaptive coding and modulation unit 13 by the increase amount Pup with respect to the transmission power upon transmitting the user data as a target of retransmission, in a manner of control effected at step S38. Then, the power setting unit 113 supplies the resultant transmission power to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Accordingly, if the current received signal quality Qnow is deteriorated as compared with the previous received signal quality Qprv but the necessary minimum increased power amount y is equal to or smaller than the maximum transmission power Pavl that can be additionally allocated, i.e., the base station has sufficient resources to increase the transmission power of the downlink data channel by the necessary minimum increased power amount y, then the data retransmission is effected at the transmission power added with increased power amount Pup which is increased as compared with the previous user data transmission. That is, the data retransmission is effected at the transmission power increased by an amount corresponding to the deteriorated amount of received signal quality. Then, the retransmission data is transmitted at the transmission mode identical to that upon the previous data transmission step.

In this case, at step S40, the transmission parameter information transmitted through the downlink control channel contains the retransmission flag. Thus, in the aforementioned terminal described with reference to FIG. 6, the user data received in the previous step and the data of the retransmission (i.e., the user data identical to the user data received in the previous step) are synthesized together to create a gain of synthesis.

When the user data received in the previous step and the data of retransmission are synthesized together, then it is estimated that the user data obtained by the synthesis comes to have an energy per bit value which derives from adding the current received signal quality Qnow and the energy corresponding to the increased power amount Pup together. Therefore, even if the propagation path characteristic upon retransmitting the user data is deteriorated as compared with the previous (or the first) user data transmission, it becomes possible to obtain a gain by synthesizing the user data received in the previous step and the retransmission data together. In this way, it becomes possible to reduce a retransmission achieving no gain, with the result that the transmission efficiency can be improved.

On the other hand, at step S36, if it is determined that the necessary minimum increased power amount y is not equal to or smaller than the maximum transmission power Pavl that can be additionally allocated, then the processing proceeds to step S42 in which the mode determining unit 111 determines a transmission mode based on the current received signal quality in a manner similar to that of step S16 shown in FIG. 10. Then, the transmission mode information is supplied together with the current received signal information Qnow to the control unit 112, and the processing proceeds to step S43.

At step S43, the control unit 112 supplies the transmission mode information supplied from the mode determining unit 111 to the control data generating unit 8. The control data generating unit 8 makes the transmission mode information be included in the transmission parameter representing various parameters of the base station upon transmission, and creates the control data containing the transmission parameter. This control data is transmitted from the control data generating unit 8 through the coding and modulation unit 9, the power adjusting unit 10, the spreading unit 11 and the transmission/reception compatible unit 1 to the antenna 14. Then, the control data is transmitted from the antenna 14 as a signal of the downlink control channel to the terminal.

In this case, the transmission parameter transmitted to the terminal does not contain the retransmission flag. This is because the retransmission data will be transmitted as new user data at step S45 which will be described later on.

Thereafter, processing proceeds to step S44 in which the control unit 112 supplies the transmission mode information and the current received signal quality information Qnow supplied from the mode determining unit 111 to the data SNR buffer 114. The information supplied thereto are saved therein in an overwriting manner and the processing proceeds to step S45.

The current received signal quality Qnow stored in the data SNR buffer 14 in step S44 will be read as a previous received signal quality Qprv when the process of step S32 is carried out in the next time.

At step S45, the data of retransmission stored in the retransmission data buffer 12 is transmitted as new data at the mode which is determined by the mode determining unit 111. Then, the processing returns.

At step S45, the control unit 112 controls the retransmission data buffer 12 so that the data of retransmission stored in the retransmission data buffer 12 is supplied to the adaptive coding and modulation unit 13. Further, the control unit 112 controls the adaptive coding and modulation unit 13 so that the retransmission data is encoded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 adjusts the transmission power of the signal outputted from the adaptive coding and modulation unit 13 so that this transmission power has a value of default or a value identical to that upon transmitting the user data in the previous time, for example. Then, the power setting unit 113 supplies the resultant value to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Accordingly, if the current received signal quality Qnow is deteriorated as compared with the previous received signal quality Qprv but the necessary minimum increased power amount y is not equal to or smaller than the maximum transmission power Pavl that can be additionally allocated to, that is, the base station does not have sufficient resources for increasing the necessary minimum increased power amount y for the transmission power of the downlink data channel, then the data of retransmission will be placed into a default value or a value transmitted at the transmission power identical to that upon transmitting the user data in the previous time and at the transmission mode determined based on the current received signal quality Qnow. Furthermore, in this case, at step S43, the transmission parameter transmitted through the downlink control channel does not contain the retransmission flag. Therefore, the terminal does not synthesize the retransmission data with the user data received in the previous step. Thus, the retransmission data is to be handled as newly transmitted new user data.

On the other hand, at step S33, if it is determined that the received signal quality difference Qprv−Qnow is not larger than the threshold value THx, that is, it is determined that the current received signal quality Qnow is not so seriously deteriorated or rather improved as compared with the previous received signal quality Qprv, then the mode determining unit 111 supplies the result of determination together with the current received signal quality Qnow and the previous received signal quality Qprv to the control unit 112. Then, the processing proceeds to step S46.

At step S46, the mode determining unit 111 refers to the data SNR buffer 114 to recognize the previous transmission mode, and determines the transmission mode for transmitting (retransmission of) the current user data as one identical to the previous transmission mode. Furthermore, at step S46, the mode determining unit 111 supplies the determined transmission mode information to the control unit 112 and the processing proceeds to step S47.

At step S47, the control unit 112 updates the previous received signal quality Qprv in such a manner that Qprv=Qprv+Qnow. The updated information is supplied to the data SNR buffer 114 and stored therein in an overwriting manner.

In the above-described situation, the user data is going to be subjected to the retransmission step with the transmission power for the downlink data channel kept as the current transmission power, i.e., the user data is retransmitted at the transmission power identical to that upon the previous user data transmission. In this case, as described with reference to FIG. 6, the terminal synthesizes the user data of the retried transmission and the user data received in the previous step together. Therefore, it is expected that synthesized user data comes to have energy per bit which derives from adding the energy per bit of the user data received in the previous step and the energy corresponding to the current received signal quality Qnow together. Accordingly, it is assumed that, owing to the user data retransmission, the received signal quality at the terminal comes to have an improved value, i.e., the previous received signal quality Qprv added with the current received signal quality Qnow. For this reason, at step S47, the control unit 112 updates the previous received signal quality Qprv in such a manner that Qprv=Qprv+Qnow.

At step S47, the control unit 112 supplies the transmission mode information supplied from the mode determining unit 111 to the control data generating unit 8 together with the retransmission flag. The control data generating unit 8 makes the transmission mode information and the retransmission flag be included in the transmission parameter indicative of various parameters of the base station upon transmission. Thus, the control data containing the transmission parameter is created. This control data is supplied from the control data generating unit 8 through the coding and modulation unit 9, the power adjusting unit 10, the spreading unit 11 and the transmission/reception compatible unit 1 to the antenna 14. Then, the control data is transmitted from the antenna 14 as a signal of the downlink control channel.

Subsequently, as described above, the processing proceeds to step S41 in which the user data of the retransmission to the terminal is transmitted at the transmission mode which is determined by the mode determining unit 111. Then, the processing returns.

In step S41, the control unit 112 controls the retransmission data buffer 12 so that the user data stored is supplied to the adaptive coding and modulation unit 13. Further, the control unit 112 controls the adaptive coding and modulation unit 13 so that the retransmission data is encoded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 adjusts the transmission power of the signal outputted from the adaptive coding and modulation unit 13 so that this transmission power has a value identical to that upon transmitting the user data in the previous time, for example, and then supplies the resultant value to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Accordingly, if it is determined that the current received signal quality Qnow is not so seriously deteriorated or rather improved as compared with the previous received signal quality Qprv, the retransmission data is transmitted at the transmission power identical to that upon transmitting the user data in the previous time and at the transmission mode identical to that upon transmitting the user data in the previous time.

In this case, in step S47, the transmission parameter transmitted through the downlink control channel contains the retransmission flag. Thus, as described above, the terminal of FIG. 6 synthesizes the user data received in the previous step and the retransmission data (user data identical to one received in the previous step) together. In this way, it becomes possible to obtain a gain deriving from the synthesis.

In this case, the user data received in the previous step and the user data of the retransmission are synthesized together. Therefore, it is expected that the synthesized user data comes to have energy per bit value which derives from addition of the energy per bit of the user data received in the previous step and the energy corresponding to the current received signal quality Qnow together. Moreover, the above-discussed case is one in which the current received signal quality Qnow is not so seriously deteriorated or rather improved as compared with the previous received signal quality Qprv. Therefore, it becomes possible to obtain a gain by synthesizing the user data received in the previous step and the retransmission data together. In this way, retransmission obtaining no gain can be suppressed and transmission efficiency can be improved.

Figure 12:
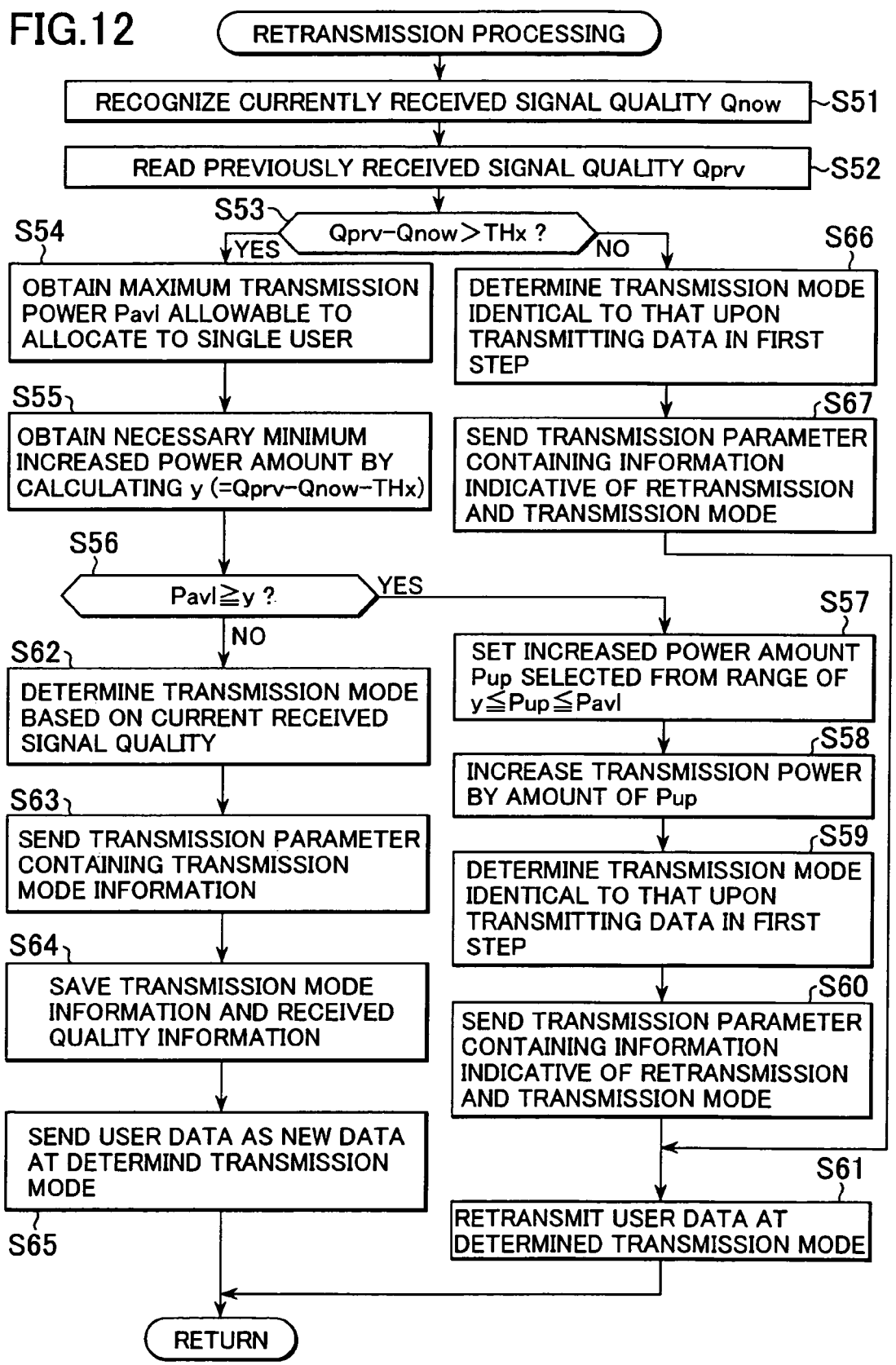
FIG. 12 is a flowchart showing a second embodiment of a retransmission processing.

FIG. 12 is a flowchart for illustrating a second embodiment of the retransmission carried out at step S20 shown in FIG. 10.

Figure 11:
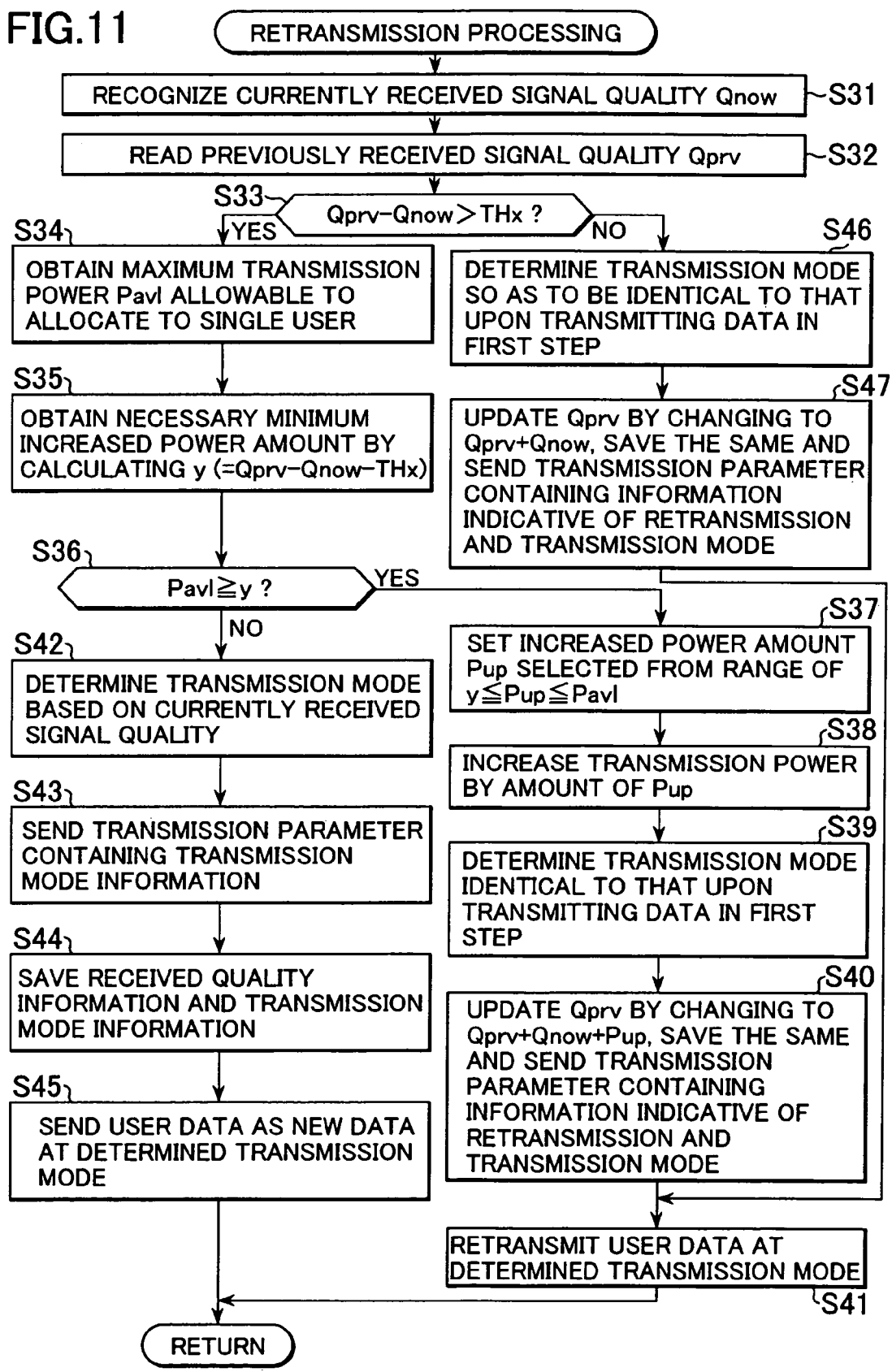
FIG. 11 is a flowchart showing a first embodiment of a retransmission processing.

In the embodiment of FIG. 11, the terminal accumulates the received signal quality information upon respective data transmission operations of from the first user data transmission (the initial user data transmission) to the previous user data retransmission, whereby estimation is made on the received signal quality upon synthesizing the data of retransmission and the user data received in the previous step. In the embodiment of FIG. 12, the received signal quality upon transmitting the data in the first time is directly utilized as an estimated value of the received signal quality at the terminal.

In the embodiment of FIG. 11, at step S40, the previous received signal quality Qprv is updated by calculating the equation Qprv=Qprv+Qnow+Pup. Alternatively, at step S47, the previous received signal quality is updated by calculating the equation Qprv=Qprv+Qnow. However, in the embodiment of FIG. 12, the received signal quality utilized for determining the transmission mode upon transmitting the user data in the first time is directly utilized as the previous received signal quality Qprv.

Accordingly, in the retransmission processing of FIG. 12, at steps S60 and S67 corresponding to steps S40 and S47, respectively, the previous received signal quality information Qprv stored in the retransmission data buffer 12 is not updated and left unchanged. But other processing carried out in steps S51 to S67 are similar to those in steps S31 to S47 of FIG. 11. Therefore, description thereof will not be made.

In the embodiment of FIG. 11, the terminal synthesizes the data of retransmission and the user data received in the previous step are synthesized together. Therefore, in steps S40 and S47, under the consideration of the gain deriving from the synthesis, the received signal quality at the terminal is estimated based on the principle that the received signal quality Qprv is added with the current received signal quality Qnow one by one.

However, the received signal quality Qnow represented by the received signal quality message transmitted from the terminal is information of received signal quality at a timing point which precedes from the user data transmission time by a time period corresponding to several frames. For this reason, the real received signal quality at the timing point when the terminal receives the retransmission data can be deviated from the received signal quality Qnow represented by the received signal quality message transmitted from the terminal. If the received signal quality recognized by the terminal can be deviated from the received signal quality represented by the received signal quality message, and nevertheless the real received signal quality is estimated by accumulating the current received signal quality Qnow on the received signal quality Qprv of the previous step, it is difficult to expect high reliability in the estimated value.

Therefore, if the data transmission is made in such a situation where only low reliability estimated value can be obtained for the received signal quality by accumulating the current received signal quality Qnow on the received signal quality Qprv of the previous step, the manner of data transmission as in the embodiment of FIG. 12 can be employed. That is, the received signal quality upon transmitting the data in the first time can be directly utilized as the estimated value of the received signal quality at the terminal.

Also by the process of retransmission of FIG. 12, similar to the case of FIG. 11, retransmission obtaining no gain can be suppressed and transmission efficiency can be improved.

In the embodiment of FIG. 11, at step S33, the accumulated value of the received signal quality deriving from an accumulation from the first data transmission to the previous data retransmission is calculated as the previous received signal quality in such a manner that the received signal quality difference Qprv−Qnow is obtained by subtracting the current received signal quality Qnow from the previous received signal quality Qprv. However, in an embodiment shown in FIG. 12, at step S53 corresponding to step S33 of FIG. 11, the received signal quality upon the first data transmission is directly regarded as the previous received signal quality Qpvr, and then difference between the previous received signal quality Qprv and the current received signal quality Qnow is calculated as the received signal quality difference Qprv−Qnow.

Figure 13:
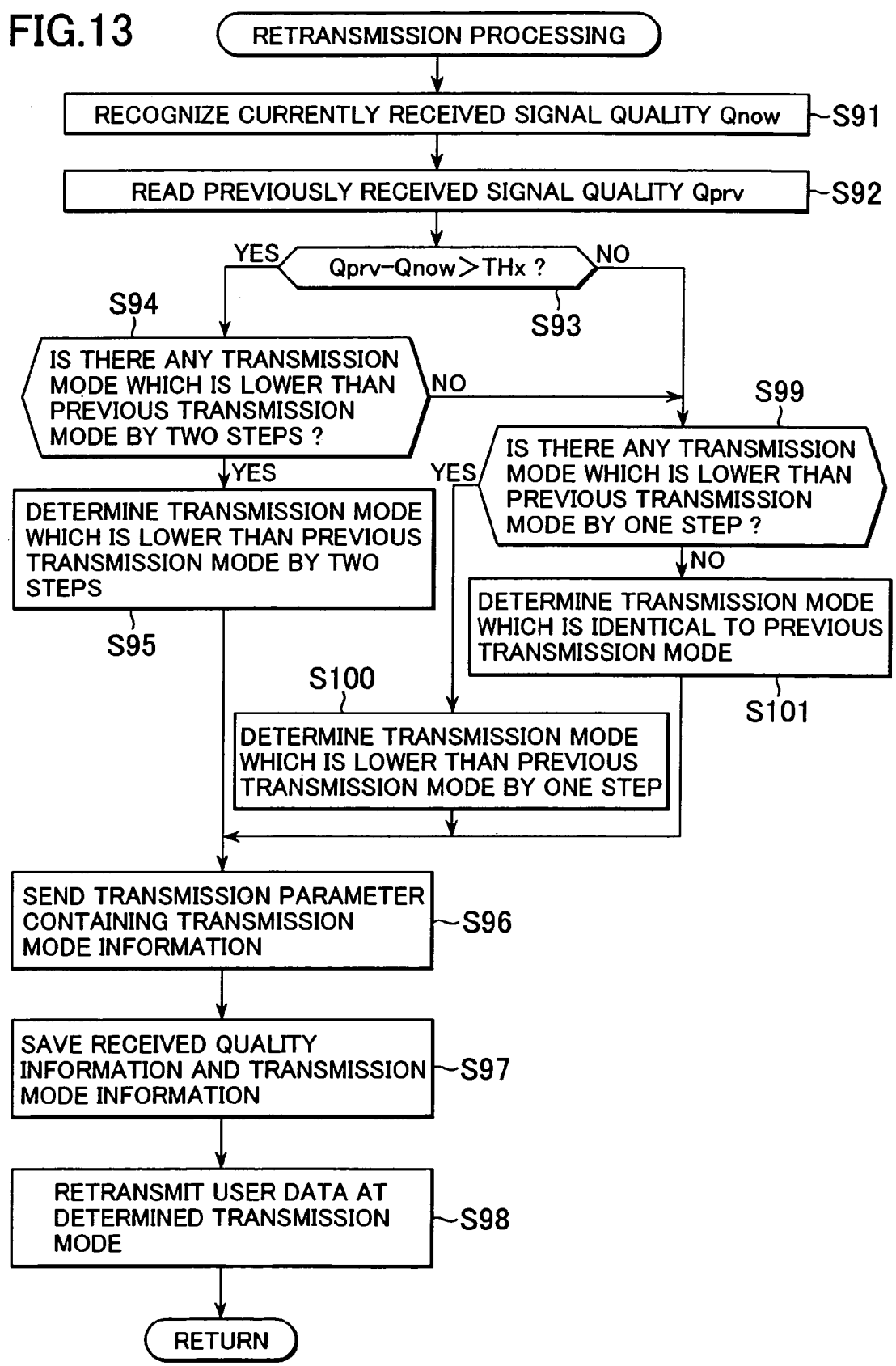
FIG. 13 is a flowchart showing a third embodiment of a retransmission processing.

Next, FIG. 13 is a flowchart showing a third embodiment of the retransmission carried out at step S20 of FIG. 10.

While in the embodiments of FIGS. 11 and 12 control is made on the transmission power of the downlink data channel of the transmission parameter upon retrying transmission based on the received signal quality Qprv−Qnow, in the embodiment of FIG. 13, control is made on the transmission mode of the transmission parameter upon retrying transmission based on the received signal quality difference Qprv−Qnow.

In the embodiment of FIG. 13, processing is carried out from step S91 to S93 in a manner similar to those carried out in steps from S31 to S33.

At step S93 corresponding to step S33, if it is determined that the received signal quality difference Qprv−Qnow is larger than the threshold value THx and hence the current received signal quality Qnow is deteriorated relative to the previous received signal quality Qprv, the mode determining unit 111 supplies information indicative of the result of the determination together with the current received signal quality Qnow to the control unit 112. Then, the processing proceeds to step S94.

At step S94, the mode determining unit 111 refers to the data SNR buffer 114 to recognize the previous transmission mode and examines whether or not a transmission mode lower than the previous transmission mode by two modes is prepared in the data SNR buffer 114.

While in the case of aforementioned FIG. 3 description is made on an assumption that merely three transmission modes are prepared for simplifying the description, in this embodiment a plural number of transmission modes, or three or more transmission modes are prepared. Further, each of the transmission modes is numbered from a smaller number to a larger number in such a manner that as the terminal can receive a signal at a received signal quality of stable variation, the terminal is assigned with a coding system or a modulation system tending to make smaller user data error rate from the statistical standpoint, i.e., a smaller coding rate or a modulation system having a larger intersymbol distance. In this case, if the value of the transmission mode is small, the noise characteristics thereof will be improved and the data transmission efficiency is lowered. Conversely, if the value of the transmission mode is large, the data transmission efficiency will be improved but the noise characteristic is deteriorated.

At step S94, if it is determined that a transmission mode lower than the previous transmission mode by two modes is not prepared, the processing proceeds to step S99 and the processing described below is carried out.

Also, at step S94, if it is confirmed that a transmission mode lower than the previous transmission mode by two modes is prepared, the processing proceeds to step S95 in which the mode determining unit 111 selects a transmission mode lower than the previous transmission mode by two modes for the transmission mode for the current user data transmission (retransmission). Further, at step S95, the mode determining unit 111 supplies the selected transmission mode to the control unit 112 and the processing proceeds to step S96.

At step S96, the control unit 112 supplies the transmission information supplied from the mode determining unit 111 to the control data generating unit 8 together with the retransmission flag. The control data generating unit 8 makes the transmission mode information and the retransmission flag to be included in the transmission parameter indicating the various parameters of the base station upon transmission so that control data containing the transmission parameter is created. The control data is supplied from the control data generating unit 8 through the coding and modulation unit 9, the power adjusting unit 10, the spreading unit 11 and the transmission/reception compatible unit 1 to the antenna 14, and transmitted from the antenna 14 as a downlink control channel.

Thereafter, the processing proceeds to step S97 in which the control unit 112 supplies the transmission information supplied from the mode determining unit 111 and the current received signal quality Qnow at the terminal to the data SNR buffer 114 so as to store therein in a manner of overwriting. Then, the processing proceeds to step S98.

At step S98, the user data to be retransmitted to the terminal is transmitted at the transmission mode selected by the mode determining unit 111. Then, the processing returns.

In step S98, the control unit 112 controls the retransmission data buffer 12 so that the user data stored in the buffer is supplied to the adaptive coding and modulation unit 13. Further, the control unit 112 controls the adaptive coding and modulation unit 13 so that the retransmission data is encoded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 adjusts the transmission power of the signal outputted from the adaptive coding and modulation unit 13 so that this transmission power takes a default status or has a value identical to that upon transmitting the user data in the previous time, for example, and then supplies the resultant value to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Accordingly, if the current received signal quality Qnow is deteriorated as compared with the previous received signal quality Qprv, the base station transmits the retransmission data at a transmission mode which greatly lowers the error rate at the terminal (in this case, a transmission mode lower than the previous transmission mode by two mode).

In this case, at step S96, since the transmission parameter transmitted through the downlink control channel contains the retransmission flag, as described above, the terminal of FIG. 6 synthesizes the user data received in the previous step and the retransmission data (user data identical to the user data received in the previous step) together. Thus, it becomes possible to obtain a synthesized gain, with the result that retransmission operation creating no gain can be suppressed and transmission efficiency can be improved.

In this case, the transmission mode upon transmitting the user data in the previous step can be different from the transmission mode upon transmitting (retransmitting) the current user data. However, as for example described with reference to FIG. 6, even if the user data transmitted in the previous step is different from the current user data (retransmission data) in the transmission mode, it is possible for the user data demodulating and decoding unit 39 to synthesize these data together by synthesizing them in the state of coded data.

Figure 6:
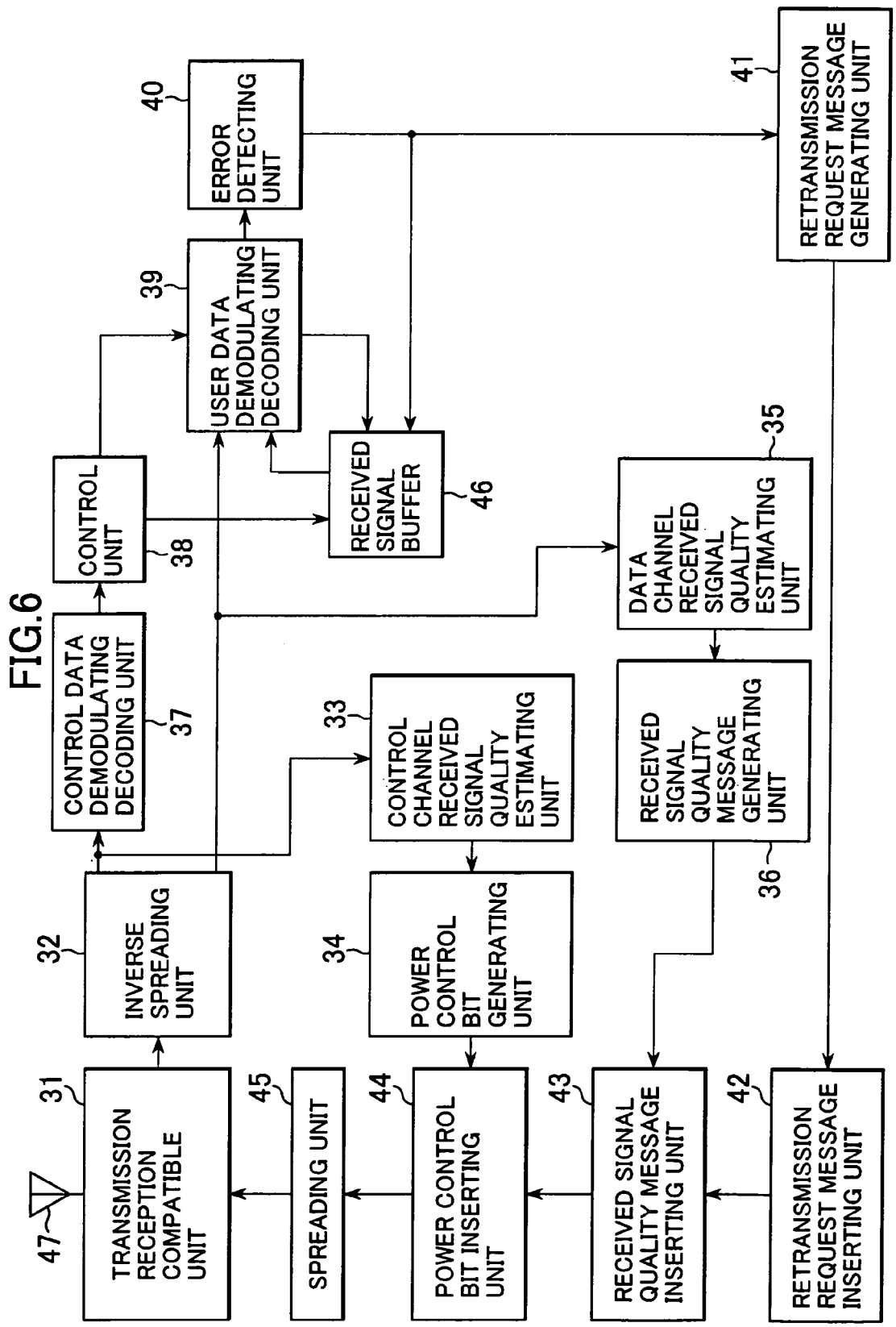
FIG. 6 is a block diagram showing one example of an arrangement of a conventional terminal.
Figure 7:
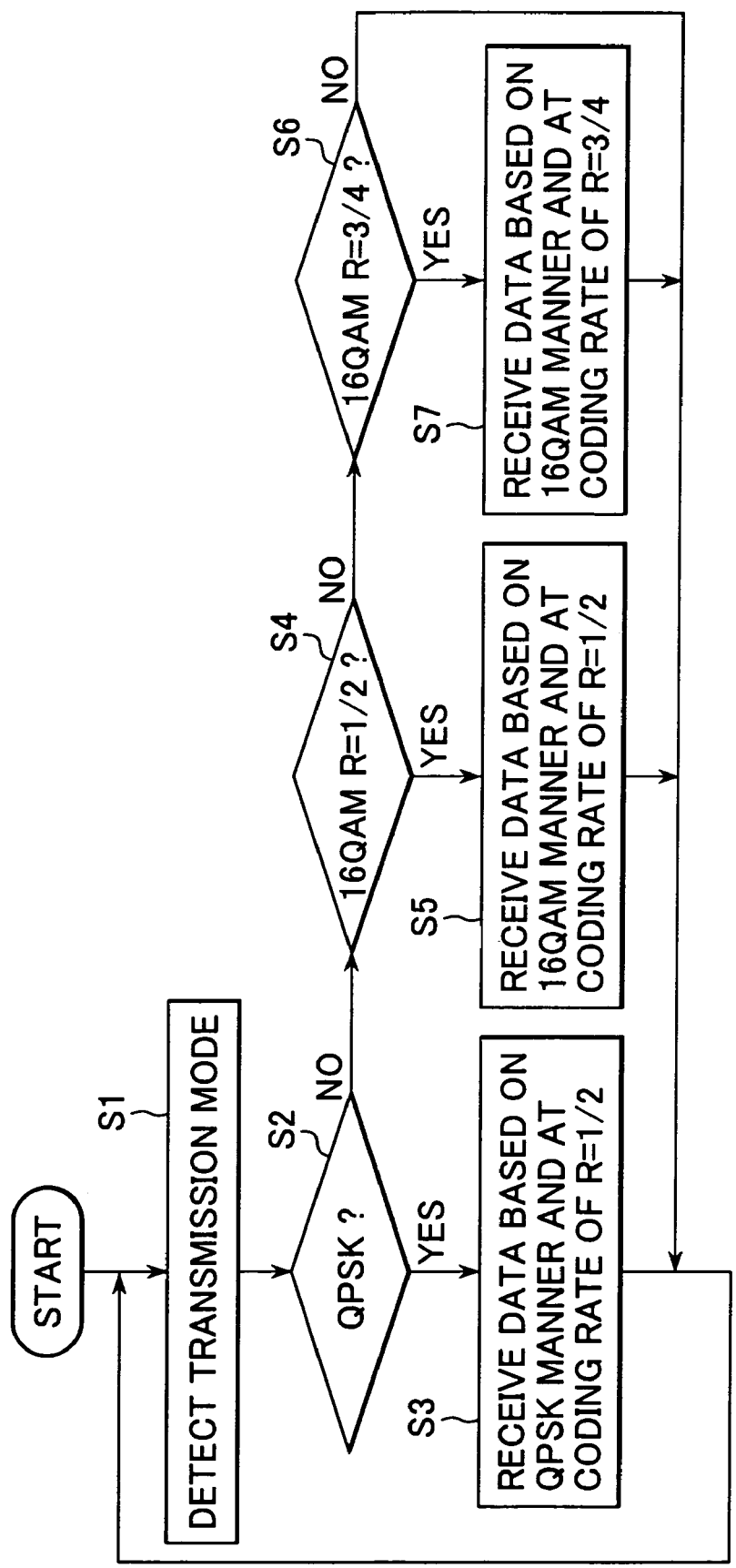
FIG. 7 is a flowchart for explaining a data receiving processing at the terminal.

In the terminal of FIG. 6, the synthesizing of the user data can be carried out on either of the data which are demodulated by the user data demodulating and decoding unit 39 or the user data which are demodulated and further decoded by the same unit. In these cases, however, the pieces of user data to be synthesized together shall have the same transmission mode. In the embodiment of FIG. 11 (and also the embodiment of FIG. 12), it is to be noted that the pieces of user data have the same transmission mode upon sending the retransmission data at step S41. Therefore, in the terminal of FIG. 6, the pieces of user data can be carried out on the state of user data which are simply demodulated by the user data demodulating and decoding unit 39 or on the state of the user data which are further decoded by the same unit.

Furthermore, at step S93, if it is determined that the received signal quality Qprv−Qnow is not larger than the threshold value THx, that is, the current received signal quality Qnow is not so seriously deteriorated or rather improved as compared with the previous received signal quality Qprv, the mode determining unit 111 supplies the result of determination to the control unit 112 together with the current received signal quality Qnow. Then, the processing proceeds to step S99.

At step S99, the mode determining unit 111 refers to the data SNR buffer 114 to recognize the previous transmission mode, whereby examination is made on whether there is any transmission mode lower than the previous transmission mode by one mode.

At step S99, if it is determined that there is a transmission mode lower than the previous transmission mode by one mode, the processing proceeds to step S100 in which the mode determining unit 111 determines the transmission mode upon the current user data transmission (retransmission) to be the transmission mode lower than the previous transmission mode by one mode. Further, at step S100, the mode determining unit 11 supplies information of the determined transmission mode to the control unit 112. Thus, the processing proceeds to step S96 and subsequently processing similar to those described above are carried out in steps S96 to S98. Then, the processing returns.

Accordingly, if the current received signal quality Qnow is not so seriously deteriorated or rather improved as compared with the previous received signal quality Qprv, the base station transmits the retransmission data at a transmission mode which somewhat lowers the error rate at the terminal (if the received signal quality is constant) (in this case, a transmission mode lower than the previous transmission mode by one modes).

Also in this case, as described above, the terminal of FIG. 6 synthesizes the user data received in the previous step and the retransmission data (user data identical to the user data received in the past step) together. Thus, it becomes possible to obtain a synthesized gain, with the result that retransmission operation creating no gain can be suppressed and transmission efficiency can be improved.

At step S99, if it is determined that there is no transmission mode lower than the previous transmission mode by one mode, that is, the previous transmission mode is the lowest transmission mode, the processing proceeds to step S101 in which the mode determining unit 111 determines the transmission mode upon the current user data transmission (retransmission) to be the transmission mode identical to the previous transmission mode. Further, at step S101, the mode determining unit 111 supplies information of the determined transmission mode to the control unit 112. Thus, the processing proceeds to step S96 and subsequently processing similar to those described above are carried out in steps S96 to S98. Then, the processing returns.

Accordingly, if the retransmission is requested but the transmission cannot be lowered relative to the previous transmission mode, then the retransmission data can be transmitted at the transmission mode identical to the previous transmission mode.

While in the embodiment of FIG. 13 the transmission mode for the retransmission is lowered relative to the previous transmission mode by one or two modes in accordance with the relationship in terms of quantity between the received signal quality difference Qprv−Qnow and the threshold value THx, the transmission mode for the retransmission maybe lowered or raised relative to the previous transmission mode by other numbers, i.e., an arbitrary number of modes.

Further, in the embodiment of FIG. 13 the transmission mode for the retransmission is lowered relative to the previous transmission mode by one or two modes in accordance with the relationship in terms of quantity between the received signal quality difference Qprv−Qnow and one threshold value THx. However, the received signal quality difference Qprv−Qnow may be compared with other plurality of threshold values so as to determine what kinds of ranges the value of the received signal quality difference Qprv−Qnow falls in, and the transmission mode for retransmission may be controlled depending on the determined range.

Furthermore, in the embodiment of FIG. 13, at step S97, the received signal quality Qnow is stored in the data SNR buffer 114 in a manner of overwriting so as to update the previous received signal quality Qprv stored in the data SNR buffer 114, by changing it into the current received signal quality Qnow (Qprv=Qnow). However, as described above, if the base station transmits the data retransmission at the changed transmission mode and the terminal synthesizes the pieces of user data (retransmission data) transmitted at different transmission modes together, the previous received signal quality Qprv stored in the data SNR buffer 114 may be updated in accordance with an equation, Qprv=Qprv+Qnow×(data_new/data_original), for example. In this equation, the data_new represents a data quantity of the retransmission data (data quantity of the original data except for the error correcting code) and the data_original represents a data quantity of the user data transmitted in the previous step.

Figure 14:
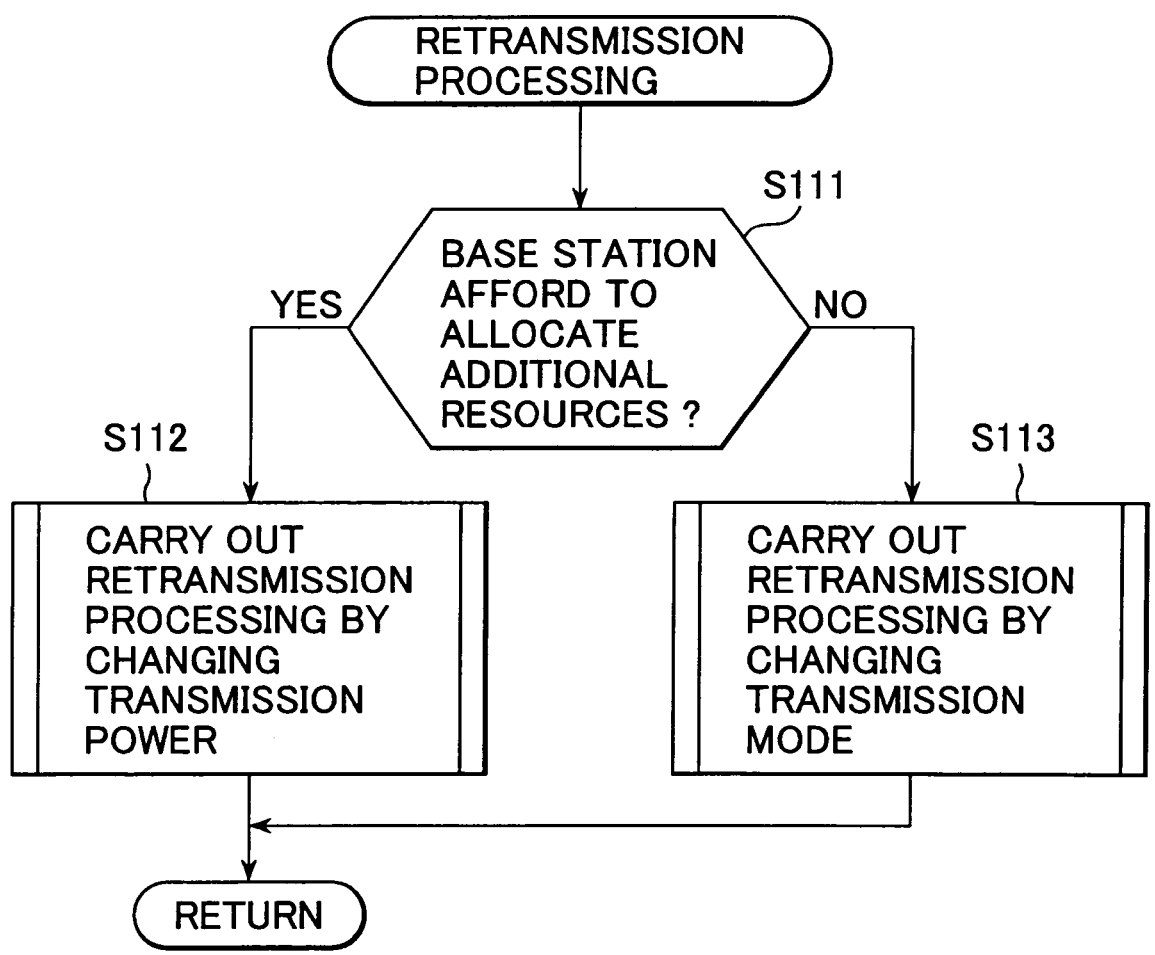
FIG. 14 is a flowchart showing a fourth embodiment of a retransmission processing.

FIG. 14 is a flowchart showing a fourth embodiment of the retransmission processing at step S20 of FIG. 10.

In the embodiments of FIGS. 11 and 12 the transmission power upon retransmitting data is controlled based on the received signal quality Qprv−Qnow, and in the embodiment of FIG. 13 the transmission mode upon retransmitting data is controlled based on the received signal quality Qprv−Qnow. However, in the embodiment of FIG. 14 both of the transmission power upon retransmitting data and the transmission mode upon retransmitting data can be controlled based on the received signal quality Qprv−Qnow.

Now the retransmission processing of FIGS. 11 and 12 is referred to as retransmission at a changed transmission power and the retransmission processing of FIG. 13 is referred to as retransmission at a changed transmission mode. In the embodiment of FIG. 14, initially, at step S111, the control unit 112 examines whether the base station can afford to allocate additional resources or not.

At step S111, if it is determined that the base station can afford to allocate additional resources, the processing proceeds to step S112 in which the retransmission processing at the changed transmission power described with reference to FIGS. 11 and 12 is carried out. Then, the processing returns.

Also, at step S111, if it is determined that the base station cannot afford to allocate additional resources, the processing proceeds to step S112 in which the retransmission processing at the changed transmission mode described with reference to FIG. 13 is carried out. Then, the processing returns.

Therefore, according to the embodiment of FIG. 14, if the base station can afford to allocate additional resources, the retransmission processing at the changed transmission power is carried out while if the base station cannot afford to allocate additional resources, the retransmission processing at the changed transmission mode is carried out.

While in the embodiment of FIG. 14 the retransmission processing at the changed transmission power or the retransmission processing at the changed transmission mode is carried out depending on the status of resources in the base station, other scheme can be employed. For example, the retransmission processing at the changed transmission power or the retransmission processing at the changed transmission mode is carried out depending on the number of terminals communicating with the base station.

Further, when the retransmission processing is carried out, a target of change (control) may not be limited to only either of the transmission power or the transmission mode. That is, both of the transmission power and the transmission mode may be changed simultaneously.

Further, when the retransmission processing at the changed transmission power is carried out at step S112, in addition to the retransmission processing shown in FIG. 11 or 12, transmission processing described with reference to FIG. 15 may be employed.

FIG. 15 is a flowchart showing a fifth embodiment of the retransmission processing effected at step S20 of FIG. 10.

In the embodiments of FIGS. 11 and 12, if the received signal quality difference Qnow−Qprov is not larger than the threshold value THx, that is, the current received signal quality Qnow is not so seriously deteriorated or rather improved as compared with the previous received signal quality Qprv, the retransmission data is transmitted at the transmission power identical to that upon sending the user data in the previous step. However, according to the embodiment of FIG. 15, if the current received signal quality Qnow is improved as compared with the previous received signal quality Qprv, the retransmission data is transmitted at the transmission power smaller than that upon sending the user data in the previous step.

The retransmission processing of FIG. 15 is carried as follows. That is, from step S121 to S135, processing is carried out in a manner similar to those carried out in steps of from S31 to S45 in FIG. 11.

At step S123 corresponding to step S33, if it is confirmed that the received signal quality difference Qprv−Qnow is not larger than the threshold value THx, that is, the current received signal quality Qnow is not so seriously deteriorated or rather improved as compared with the previous received signal quality Qprv, the mode determining unit 111 supplies the result of determination together with the current received signal quality Qnow and the previous received signal quality Qprv to the control unit 112. Then, the processing proceeds to step S136.

At step S136, similarly to the case of step S46 in FIG. 11, the mode determining unit 111 refers to the data SNR buffer 114 to recognize the previous transmission mode, and determines the transmission mode for transmitting (retransmitting) the current user data as one identical to the previous transmission mode. Furthermore, at step S136, the mode determining unit 111 supplies the determined transmission mode information to the control unit 112 and the processing proceeds to step S137.

At step S137, the control unit 112 examines whether the current received signal quality Qnow is larger than the previous received signal quality Qprv, that is, whether the received signal quality is improved or not.

At step S137, if it is confirmed that the current received signal quality Qnow is not larger than the previous received signal quality Qprv, that is, the received signal quality is not improved but not so seriously deteriorated, the processing proceeds to steps S138 and S131 sequentially. Thus, the retransmission data is transmitted at the transmission power identical to that upon sending the user data in the previous time.

At step A138, similarly to the case of step S47 in FIG. 11, the control unit 112 updates the previous received signal quality Qprv in such a manner that Qprv=Qprv+Qnow, and supplies the updated information to the data SNR buffer 114 in which the information is stored therein in an overwriting manner.

At step S138, the control unit 112 supplies the transmission mode information supplied from the mode determining unit 111 to the control data generating unit 8 together with the retransmission flag. The control data generating unit 8 makes the transmission mode information and the retransmission flag be included in the transmission parameter indicative of various parameters of the base station upon transmission. Thus, the control data containing the transmission parameter is created. This control data is supplied from the control data generating unit 8 through the coding and modulation unit 9, the power adjusting unit 10, the spreading unit 11 and the transmission/reception compatible unit 1 to the antenna 14. Then, the control data is transmitted from the antenna 14 as a signal of the downlink control channel.

Subsequently, the processing proceeds from step S138 to step S131 in which, as in the manner of step S41 of FIG. 11, the user data to be retransmitted to the terminal is transmitted at the transmission mode which is determined by the mode determining unit 111. Then, the processing returns.

In step S131, the control unit 112 controls the retransmission data buffer 12 so that the user data stored in the buffer is supplied to the adaptive coding and modulation unit 13. Further, the control unit 112 controls the adaptive coding and modulation unit 13 so that the retransmission data is encoded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 adjusts the transmission power of the signal outputted from the adaptive coding and modulation unit 13 so that this transmission power has a value identical to that upon transmitting the user data in the previous time, for example, and then supplies the resultant value to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Accordingly, if it is determined that the current received signal quality Qnow is not so seriously deteriorated but improvement is not confirmed as compared with the previous received signal quality Qprv, the retransmission data is transmitted at the transmission power identical to that upon transmitting the user data in the previous time and at the transmission mode identical to that upon transmitting the user data in the previous time.

In this case, in step S138, the transmission parameter transmitted through the downlink control channel contains the retransmission flag. Thus, as described above, the terminal of FIG. 6 synthesizes the user data received in the previous step and the retransmission data (user data identical to one received in the previous step) together. In this way, it becomes possible to obtain a synthesized gain.

In this case, the user data received in the previous step and the user data of the retransmission are synthesized together. Therefore, it is expected that the synthesized user data comes to have energy per bit value which derives from addition of the energy per bit of the user data received in the previous step and the energy corresponding to the current received signal quality Qnow together. Moreover, the above-discussed case is one in which the current received signal quality Qnow is not so seriously deteriorated but improvement is not confirmed as compared with the previous received signal quality Qprv. In other words, the current received signal quality Qnow is not very much different from the previous received signal quality Qprv. Therefore, it becomes possible to obtain a gain by synthesizing the user data received in the previous step and the retransmission data together. In this way, retransmission obtaining no gain can be suppressed and transmission efficiency can be improved.

On the other hand, at step S137, if it is determined that the current received signal quality Qnow is larger than the previous received signal quality Qprv, that is, the received signal quality is improved, the processing proceeds to step S139 in which the control unit 112 calculates an equation Pdown=Qnow−Qprv, for example, to obtain the decreased power amount Pdown as a decreased power amount of the transmission power for the downlink data channel. Further, at step S139, the control unit 112 controls the power setting unit 113 so that the transmission power for the downlink data channel as one of the transmission parameters is decreased by the decreased power amount Pdown. Then, the processing proceeds to step S140.

At step S140, the control unit 112 updates the previous received signal quality Qprv in such a manner that Qprv=Qprv+Qnow−Pdown. The updated information is supplied to the data SNR buffer 114 and stored therein in an overwriting manner.

In the above-described situation, the user data is going to be subjected to the retransmission step with the transmission power for the downlink data channel changed from the transmission power upon sending the user data as a target of retransmission in the previous step into one decreased by the decreased power amount Pdown. In this case, as described with reference to FIG. 6, the terminal synthesizes the user data of retransmission (or the coded data of the same) and the user data received in the previous step together. Therefore, it is expected that synthesized user data comes to have energy per bit which derives from adding the energy per bit of the user data received in the previous step and the energy corresponding to a subtracted value which is created by subtracting the increased power amount Pup from the current received signal quality Qnow. Accordingly, it is assumed that, owing to the user data retransmission, the received signal quality at the terminal comes to have an improved value, i.e., the previous received signal quality Qprv added with the current received signal quality Qnow and further subtracted by the decreased power amount Pdown. For this reason, at step S140, the control unit 112 updates the previous received signal quality Qprv in such a manner that Qprv=Qprv+Qnow−Pdown.

At step S140, the control unit 112 supplies the transmission mode information supplied from the mode determining unit 111 to the control data generating unit 8 together with the retransmission flag. The control data generating unit 8 makes the transmission mode information and the retransmission flag be included in the transmission parameter indicative of various parameters of the base station upon transmission. Thus, the control data containing the transmission parameter is created. This control data is supplied from the control data generating unit 8 through the coding and modulation unit 9, the power adjusting unit 10, the spreading unit 11 and the transmission/reception compatible unit 1 to the antenna 14. Then, the control data is transmitted from the antenna 14 as a signal of the downlink control channel.

Subsequently, the processing proceeds from step S140 to step S131 in which, as in the manner of step S41 of FIG. 11, the user data to be retransmitted to the terminal is transmitted at the transmission mode which is determined by the mode determining unit 111. Then, the processing returns.

In step S131, the control unit 112 controls the retransmission data buffer 12 so that the user data stored in the buffer is supplied to the adaptive coding and modulation unit 13. Further, the control unit 112 controls the adaptive coding and modulation unit 13 so that the retransmission data is coded and modulated at the transmission mode determined by the mode determining unit 111. The adaptive coding and modulation unit 13 subjects the retransmission data supplied thereto to the coding and modulation process in accordance with the control of the control unit 112 and supplies the resultant data to the power setting unit 113. The power setting unit 113 adjusts the transmission power of the signal outputted from the adaptive coding and modulation unit 13 so that, as is controlled in step S139, the user data as a target of retransmission is changed from the transmission power upon transmitting the data in the previous time to one decreased by the decreased power amount Pdown. Thereafter, the power setting unit supplies the resultant value to the spreading unit 11. The spreading unit 11 and the transmission/reception compatible unit 1 carry out the processing similar to those described with reference to FIG. 2 in the following steps. As a consequence, the retransmission data is transmitted as a signal of the downlink data channel from the antenna 14 to the terminal.

Therefore, if the current received signal quality Qnow is improved as compared with the previous received signal quality Qprv, the retransmission data is transmitted at a transmission power smaller than that upon sending the user data in the previous step by an amount corresponding to the improvement.

In this case, in step S140, the transmission parameter transmitted through the downlink control channel contains the retransmission flag. Thus, as described above, the terminal of FIG. 6 synthesizes the user data received in the previous step and the retransmission data (user data identical to one received in the previous step) together. In this way, it becomes possible to obtain a synthesized gain.

Further, in this case, since the transmission power for the retransmission is decreased, it becomes possible to avoid an event in which the retransmission is carried out at a transmission power exceeding a transmission power which is necessary for the terminal to receive the user data satisfactorily. Accordingly, the transmission power can be prevented from being consumed uselessly, the energy saved by preventing the useless consumption can be allocated to transmission power for another terminal, and hence the transmission power can be effectively controlled.

In more detail, when the current received signal quality Qnow is improved as compared with the previous received signal quality Qprv, if the transmission power is made smaller than that upon sending the user data in the previous step by the decreased power amount Pdown (=Qnow−Qprv), the terminal can obtain sufficient gain by an amount corresponding to the improved level of the received signal quality at a high possibility. Therefore, if the current received signal quality Qnow is improved as compared with the previous received signal quality Qprv, it is reasonable for the transmission power for the data retransmission to be made small as compared with that upon sending the user data in the previous step. With this arrangement, it becomes possible to obtain sufficient synthesizing gain and energy can be effectively utilized for the transmission power.

Now description will be made on that the processing of the above-described mode determining unit 111 and the control unit 112 can be effected on the hardware base or software base. If a series of processing is carried out based on a software, a program constituting the software is installed in a general-purpose computer or the like.

FIG. 16 is a diagram showing an arrangement of one embodiment as a computer having a program for executing the above-described series of processing.

The program may be recorded in advance in a hard disc 205 or a ROM 203 as a recording medium provided within the computer.

Alternatively, the program may be stored (recorded) temporarily or permanently in a removable recording medium 211 such as a flexible disc, a CD-ROM (Compact Disc Read Only Memory), MO (Magneto Optical) disc, a DVD (Digital Versatile Disc), a magnetic disc, or a semiconductor memory. These kinds of removable recording medium 211 may be offered as a package software.

The program may be installed from the above-described removable recording medium 211 into the computer, or alternatively, the program may be transferred from a download site through an earth satellite such as a digital broadcast satellite to the computer in a radio transmission manner. Furthermore, the program may be transferred from the download site through any network such as a LAN (Local Area Network), the internet to the computer in a cable communication manner. The computer may receive the program transferred in the above manner at a communicating unit 208 and the program may be installed in the hard disc 205 provided in the computer.

The computer has a CPU (Central Processing Unit) 202 provided therein. The CPU 202 is connected with an input/output interface 210 through a bus 201. When a user operates an input unit 207 composed of a keyboard, a mouse, a microphone or the like to enter a command and the command is supplied to the CPU 202 through the input/output interface 210, the program stored in the ROM (Read Only Memory) is executed in accordance with the command. Alternatively, the CPU 202 loads the program on the RAM (Random Access Memory) 204 and executes the program. The program may be obtained by reading the hard disc 205 having the program stored therein, by being transferred through the satellite or the network and received at the communicating unit 208 and installed in the hard disc 205, or by reading from the removable recording medium 211 attached to the drive 209. In this way, the CPU 202 carries out the processing in accordance with the above-described flowchart. Alternatively, the arrangement shown in the above block diagram carries out the processing. Thereafter, the CPU 202 generates the result of processing through the input/output interface 210, for example, to an output unit 206 composed of a LCD (Liquid Crystal Display) depending on necessity. Alternatively, the result of processing may be transmitted from the communicating unit 208, recorded in the hard disc 205, or subjected to any other processing.

In this specification, the processing steps describing the program for making the computer carry out the various processing should not be always processed in the chronological sequence which is illustrated in the flowchart. The description of the present specification intends to include a manner of processing in which these processing steps are executed in a parallel fashion or executed separately (e.g., parallel processing or object oriented processing).

Further, the program may be processed by a single unit of computer or by a plural units of computers in a distributed manner. Further, the program may be transferred to a computer far away from the communication system and executed in the computer.

The present invention can be applied to any kinds of communication systems in which the base station can acquire information of the received signal quality at the terminal and which employs the Hybrid-ARQ system.

For example, if the communication system employs a W-CDMA system, the terminal transmits a received signal quality message indicating the received signal quality at the terminal, to the base station. Therefore, the base station can acquire the received signal quality information from the received signal quality message.

On the other hand, if the communication system employs an HDR (High Data Rate) system, for example, the terminal determines the transmission mode to be requested from the base station based on the received signal quality thereat, and the base station can receive the transmission mode. Also in this case, the base station can estimate the received signal quality at the terminal based on the transmission mode transmitted from the terminal.

Accordingly, the present invention can be applied to not only a communication system such as the W-CDMA system in which the terminal transmits the received signal quality message, but also a communication system in which the terminal transmits the transmission mode.

INDUSTRIAL APPLICABILITY

As described above, according to the present invention, it becomes possible to suppress retransmission operation obtaining no gain and improve the transmission efficiency.

The invention claimed is:

1. A transmission apparatus adapted to retransmit data to a terminal for receiving data based on a Hybrid Automatic repeat ReQuest system, said transmission apparatus comprising:
    differential information calculating means for calculating differential information regarding a difference in received signal qualities at said terminal;
    control means for controlling a transmission parameter upon transmitting said data to said terminal based on said differential information;
    first generating means for generating an energy per bit value based on a current received signal quality and an increased power amount;
    second generating means for generating updated signal quality data based on the previous received signal quality and said current received signal quality and said increased power amount; and
    transmitting means for transmitting said data to said terminal in accordance with said transmission parameter and the energy per bit value,
    wherein when the current received signal quality is lower than the previous received signal quality by a predetermined amount and the increased power amount to improve the received signal quality is smaller than or equal to a maximum transmission power allowed to be assigned to a single user at that time, the previous received signal quality is replaced by the addition of the previous received signal quality, the current received signal quality, and the increased power amount.

2. The transmission apparatus according to claim 1, wherein said transmission parameter is a transmission power upon transmitting said data.

3. The transmission apparatus according to claim 1, further comprising:
    coding means for coding said data;
    modulation means for modulating said data,
    wherein said transmission parameter is one of a coding system for coding said data and a modulating system for modulating said data.

4. The transmission apparatus according to claim 1, wherein
    said differential information is indicative of a difference between quality of a received signal at the current stage and quality of a received signal upon first data transmission recognized by said terminal.

5. The transmission apparatus according to claim 1, wherein said differential information is indicative of a difference at the terminal between a quality value of a received signal at the current step and a quality value derived from accumulation of quality-values of received signals upon respective data transmissions from the first step to the previous step.

6. The transmission apparatus according to claim 1, further comprising:
    receiving means for receiving a received signal quality message transmitted from said terminal and indicative of a quality of a signal recognized at said terminal upon receiving the signal,
    wherein said differential information calculating means calculates said differential information by using said received signal quality message received by said receiving means.

7. A method for controlling signal transmission for use in a transmission apparatus which is adapted to retransmit data to a terminal for receiving data based on a Hybrid Automatic repeat ReQuest system, said method comprising the steps of:
    calculating differential information regarding the difference in the received signal qualities at said terminal;
    generating an energy per bit value based on a current received signal quality and an increased power amount;
    controlling a transmission parameter upon transmitting said data to said terminal based on said differential information and the energy per bit value; and
    generating updated signal quality data based on the previous received signal quality and said current received signal quality and said increased power amount,
    wherein when the current received signal quality is lower than the previous received signal quality by a predetermined amount and the increased power amount to improve the received signal quality is smaller than or equal to a maximum transmission power allowed to be assigned to a single user at that time, the previous received signal quality is replaced by the addition of the previous received signal quality, the current received signal quality, and the increased power amount.

8. A computer-readable medium, adapted to store program code to control a transmission apparatus adapted to retransmit data to a terminal for receiving data based on a Hybrid Automatic repeat ReQuest system, said program code comprising the steps of:
    calculating differential information regarding a difference in the received signal qualities at said terminal;
    generating an energy per bit value based on a current received signal quality and an increased power amount;
    generating updated signal quality data based on the previous received signal quality and the current received signal quality and the increased power amount; and
    controlling a transmission parameter upon transmitting said data to said terminal based on said differential information and the energy per bit value,
    wherein when the current received signal quality is lower than the previous received signal quality by a predetermined amount and the increased power amount to improve the received signal quality is smaller than or equal to a maximum transmission power allowed to be assigned to a single user at that time, the previous received signal quality is replaced by the addition of the previous received signal quality, the current received signal quality, and the increased power amount.

* * * * *